United States Patent [19]

Jahnke et al.

[11] Patent Number: 4,534,093
[45] Date of Patent: Aug. 13, 1985

[54] BEO-TYPE MACHINING SYSTEM

[75] Inventors: William R. Jahnke, Fairfield; Bruce H. Rockel, Shelton; Barry J. Brown, Stratford; Floyd E. Hawley, Devon; Andrew J. Pennella, Woodmont; John C. Sugrue, Stratford; William R. Wiggins, Trumbull, all of Conn.

[73] Assignee: Textron Inc., Bridgeport, Conn.

[21] Appl. No.: 415,658

[22] Filed: Sep. 7, 1982

[51] Int. Cl.³ .............................................. B23Q 1/02
[52] U.S. Cl. .................... 29/26 A; 308/3 A; 408/234; 409/235; 409/241
[58] Field of Search ............... 308/3 A, 3 R; 409/234, 409/235, 241, 37–39, 62, 69, 219, 225; 29/568, 26 R, 26 A; 408/234

[56] References Cited

U.S. PATENT DOCUMENTS

| 1,195,630 | 8/1916 | Walsh | 409/225 X |
| 3,169,449 | 2/1965 | Adelt | 409/235 |
| 3,187,609 | 6/1965 | Stephan | 409/241 X |
| 3,220,782 | 11/1965 | McCabe | 308/3 A |
| 3,461,776 | 8/1969 | Hamori et al. | 409/219 |
| 3,503,283 | 3/1970 | Jacobson et al. | 308/3 R |
| 4,191,367 | 3/1980 | Speiser et al. | 308/3 A X |
| 4,358,888 | 11/1982 | Zankl et al. | 29/568 |

Primary Examiner—William R. Briggs
Attorney, Agent, or Firm—Mattern, Ware, Stoltz & Fressola

[57] ABSTRACT

An automatic numerically controlled machine tool or "bed machining center" presents a tool carrying spindle rotating in a vertically movable head sliding on a forwardly and rearwardly movable column, for cutting tool engagement with a workpiece clamped on a laterally movable table. The head, the column and the table are slidingly movable by precision ball screws on mutually perpendicular way members, accurately positioned with pivoting fine adjustment. Sliding ramp gib pack cam block pairs further adjust the sliding members for maximum precision. Replacement spindle and vertical ball screw assemblies are easily substituted for rapid maintenance. High volume coolant circulation flushes chips away from the workpiece. A concealed tool change carriage glides forward from an enclosure, receives the previous tool from the spindle, indexes the next tool, releases it for automatic loading in the spindle collet, and retracts into its enclosure.

7 Claims, 23 Drawing Figures

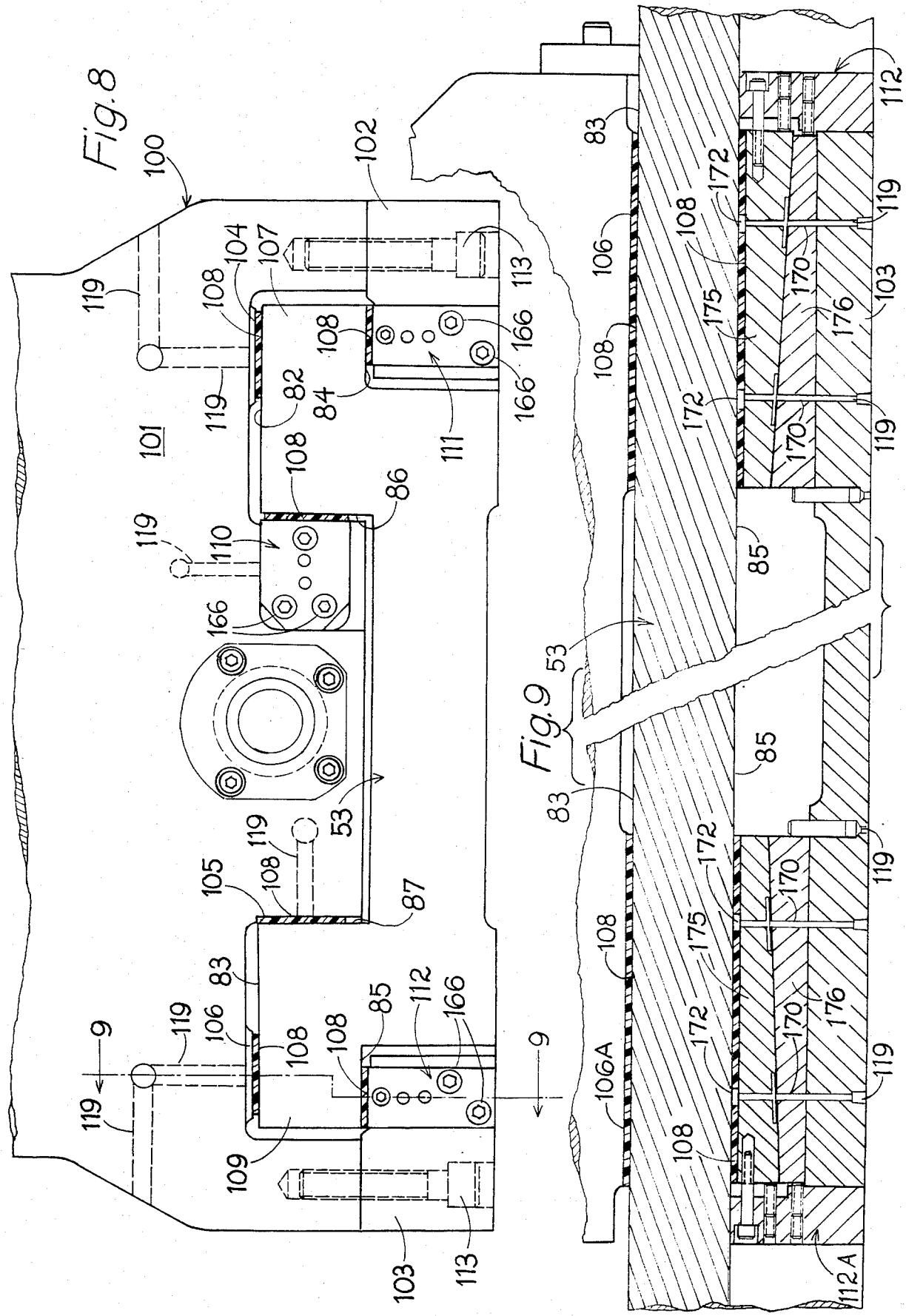

BEO-TYPE MACHINING SYSTEM

TECHNICAL FIELD

This invention relates to machine tools such as milling machines, and more particularly to a bed-type machining system having inherent precision-assuring features, automatic tool changing capabilities and electronic computer numerical control.

BACKGROUND ART

Through the years, turret-type millers, cutters and grinders have evolved from a single stand-alone, hand-operated milling machine into massive, automatically controlled machines which are capable of completely machining a plurality of workpieces without operator assistance. However, although major advances have been achieved in milling machine equipment, many problems have resulted from the newer equipment which continue to plague the industry and have been incapable of resolution, until the present invention.

In particular, precise accuracy in setting up the three mutually perpendicular axes of any machine has been, and continues to be, a critical factor in providing equipment capable of achieving precise, accurate machined parts. However, in spite of the importance and criticality of precision orientation of the three axes, the prior art systems' constructions have not attained the desired precision in a manner which is inexpensive as well as quickly and easily achieved during the manufacturing process, and once installed and set, is capable of being consistently repeated without time-consuming readjustment if any axis-defining means must be disturbed for repairs, maintenance or any other reason.

In addition to the necessity of having the axis-defining supporting guide rails or ways mounted mutually perpendicular to each other with precision and complete accuracy, the keepers or way-engaging members must be slidably engaged with the ways and also aligned therewith in a manner which assures ample supporting contact area while establishing a path through which the keeper moves that is precisely parallel to the way surface. However, in spite of this requirement which has been necessary in all prior art systems, these prior art systems have been incapable of achieving an assembly method wherein the requisite accuracy and precision can be achieved quickly and easily during the manufacturing or installation process.

Additional difficulties found with prior art bed-type milling machines are found in the kind of automatic tool changer which has become common in these prior art systems. Although numerous alternate constructions for automatically changing the tool being employed by the milling machine have been developed, all of these prior art tool changers suffer from a high degree of complexity in both construction and operation. As a result, these prior art tool changers are highly susceptible to breakdowns, since they must incorporate numerous moving parts and, typically, are designed to go through various convoluted and cumbersome paths of movement for removing a tool from the machine's spindle and inserting a new tool therein.

Furthermore, prior art systems attempt to achieve removal of chips and cuttings from the general tool area while also protecting the workers from accident or entry into the cutting area. However, prior art machines have been unable to successfully and completely protect workers from injury as well as being unable to completely remove cuttings from the work area.

In addition, prior art machines have generally been constructed with primary emphasis on ruggedness and inherent strength and rigidity, without real consideration being given to the removability of moving parts therein which are susceptible to wear and tend to require removal and replacement. Consequently, these prior art machines must often be partially disassembled in order to gain access to the subassembly requiring such replacement. As a result of this type of construction, replacement of such subassemblies becomes extremely expensive due to the labor intensive effort and machine down-time necessitated in disassembling and subsequently reassembling major portions of the machine which did not need replacement but were required to be disassembled in order to gain access to the malfunctioning parts.

Consequently, it is a principal object of the present invention to provide a bed-type machining system which incorporates three independent tracks or way systems which are set geometrically for precise mutual perpendicularity, with unusual simplicity and economy.

Another object of the present invention is to provide a bed-type machining system having the characteristic features defined above and which assures the maintenance of this perpendicularity and quick and easy restoration of the perpendicularity, if disassembly is ever required.

Another object of the present invention is to provide a bed-type machining system having the characteristic features described above and incorporating movable carriage or keeper assemblies which are easily adjustable to assure precision alignment of the keepers with the way system, as well as continuous, trouble-free slidability therealong.

Another object of the present invention is to provide a bed-type machining system having the characteristic features described above and having a tool changer mechanism capable of quickly and easily removing and replacing tools automatically, without requiring excessive movement or a secondary tool transfer mechanism.

A further object of the present invention is to provide a bed-type machining system having the characteristic features described above, which incorporates an overall structure providing inherent rigidity and structural integrity to the system while also attaining modularization and accessibility of component subassemblies for easy removability and replacement thereof.

A further object of the present invention is to provide a bed-type machining system having the characteristic features described above which is also constructed for optimum safety and protection for workers while providing a chip removal system which attains virtually total removal of chips from the work area.

Other and more specific objects will in part be obvious and will in part appear hereinafter.

For a fuller understanding of the nature and objects of the invention, reference should be had to the following detailed description taken in connection with the accompanying drawings.

DISCLOSURE OF INVENTION

In the bed-type machining system of the present invention, all of the prior art drawbacks and limitations have been eliminated and a totally new machining system has been achieved which is capable of meeting the demands and requirements now prevailing in the industry. In particular, the machining system of the present invention achieves precise mutual perpendicularity of all of the three axes along which the system operates, providing individual ways which are hardened and precision ground to assure inherent structural integrity and maximum flatness throughout their length. In addition, each of the three individual way members are first mounted in their location by a single support pin about which each of the individual way members may pivot. Then, by employing precision aligning blocks, laser beams and other electronic aligning mechanisms, common in the industry, each way system is adjusted about its pivot axis until precision mutual perpendicularity of each way member is attained. Then, the way members are rigidly secured to their particular support members.

In addition, once an individual way member has been secured in the location desired for attaining the precise mutual perpendicularity of all three way systems, a locating pin is mounted at the longitudinally opposite end from the pivot pin along the central axis of the way member in order to provide and assure re-installation in the precise predetermined location for each way member, if removal or replacement of the way member is ever required. In this manner, a way member, whenever necessary, can be removed for repairs and then can immediately be replaced in the precise selected position to provide the desired geometrically precise mutual perpendicularity.

In order to further enhance and assure complete accuracy and precision operation, the machining system of the present invention also incorporates unique gib pack assemblies which are mounted to all keepers slidably mounted to the individual way systems. With the gib packs of the present invention, each keeper assembly or sliding member which is mounted to one of the individual way members, is quickly and easily adjusted to assure parallelism thereof as well as full area contact between the gib packs and the way member.

In order to attain this maximum parallel adjustment and full area contact, the sliding, cooperating, ramp-engaged members of each gib pack assembly are constructed as a unitary, preassembled component with the juxtaposed, spaced, cooperating mounting surfaces thereof ground to be precisely parallel to each other. In addition, each member of the cooperating, ramp-engaged adjusting blocks are maintained as a cooperating unit throughout all production steps, up to and including installation. In this way, assurance is provided that when the blocks are installed in position with a particular sliding member and adjusted for precise parallelism with the way member, no departure from parallelism will be introduced by the adjustment-producing movement of the ramp blocks, since the two controlling surfaces are both constructed to be precisely parallel. Consequently, any adjustment will achieve uniform, vertical or horizontal height adjustment only, while producing precise parallelism over full area contact.

Furthermore, the base of the machining system of the present invention is constructed with a plurality of independent supporting plates, each of which are positioned in juxtaposed spaced cooperating relationship with each other in order to achieve open cavities or tunnels through which all hydraulic, lubricant or coolant conduits and all power and control cables are positioned out of the way, without fear of unwanted exposure or damage. As a result of this construction, all replaceable components are readily accessible, while all conduits, cables and associated equipment are maintained in enclosed tunnel areas, protected from damage.

The bed-type machining system of the present invention is also specifically constructed with a unique internal supporting rib arrangement to provide complete accessibility to all subassemblies or components which are likely to need repair or replacement after experiencing normal wear degradation. In particular, the machining system of the present invention comprises a supporting column structure with internal supporting ribs or plates integrally connected with each other in order to provide the strength and rigidity necessary to withstand the forces inherent in the operation of the system. However, the supporting plates and ribs are arranged in such a manner as to provide the requisite rigidity, while also providing accessibility to parts.

In addition, a cartridge type spindle assembly is employed to allow the spindle to be completely removed and replaced whenever maintenance or replacement are required.

The machining system of the present invention also provides a workpiece supporting zone which incorporates a ramped troughs and coolant flushing system which floods the area with a continuously recycled, high volume coolant. These features combine to achieve substantially complete removal of all chip material and delivery of the removed chips to a screen area at the base of the ramped troughs where the chips can be quickly and easily disposed of.

In addition, the entire work zone is peripherally surrounded with high impact resistant, transparent panels extending above normal viewing height to provide safety and protection for all workers, as well as any observers in the general area. As a result, a clean, protected work area is provided, while the system automatically operates in accordance with its preprogrammed instructions.

Finally, the bed-type machining system of the present invention also incorporates a unique tool changing assembly which houses about twenty different tool holders in a carrousel fashion for delivering any desired tool member to the operating head of the machining system, when so commanded by the preprogrammed instructions. In addition, the present invention provides the tool changing assembly housing the desired array of tools in an enclosure removed from the work area and, upon command, delivers the carrousel tool changer directly under the operating head of the machining system for removal of the tool holder therein and replacement with a desired new tool. Once installed, the entire carrousel tool changing assembly is removed from the work area, allowing the system to proceed with its next machining operation on the workpiece. In this way, the operating head of the machining system need move only vertically with the desired tools being delivered directly to the operating head in a direct and simplified manner, without requiring complicated tool transfer mechanisms or convoluted delivery paths for the individual tool holders.

The invention accordingly comprises the features of construction, combinations of elements and arrangements of parts which will be exemplified in the construction hereinafter set forth, as well as the several steps and the relation of one or more of such steps with respect to each of the others in the production of subassemblies thereof, and the scope of the invention will be indicated in the claims.

BRIEF DESCRIPTION OF THE DRAWINGS

FIG. 8 is a fragmentary top plan view of the rear or keeper portion of the head assembly shown with keeper bars bolted in position securing the head assembly to the vertical Z-axis way member;

FIG. 9 is a fragmentary side elevation view of the rear or keeper portion of the head assembly and associated vertical or Z-axis way member of FIG. 8 taken along the section line 9—9 shown in FIG. 8;

BEST MODE FOR CARRYING OUT THE INVENTION

Figure 1:
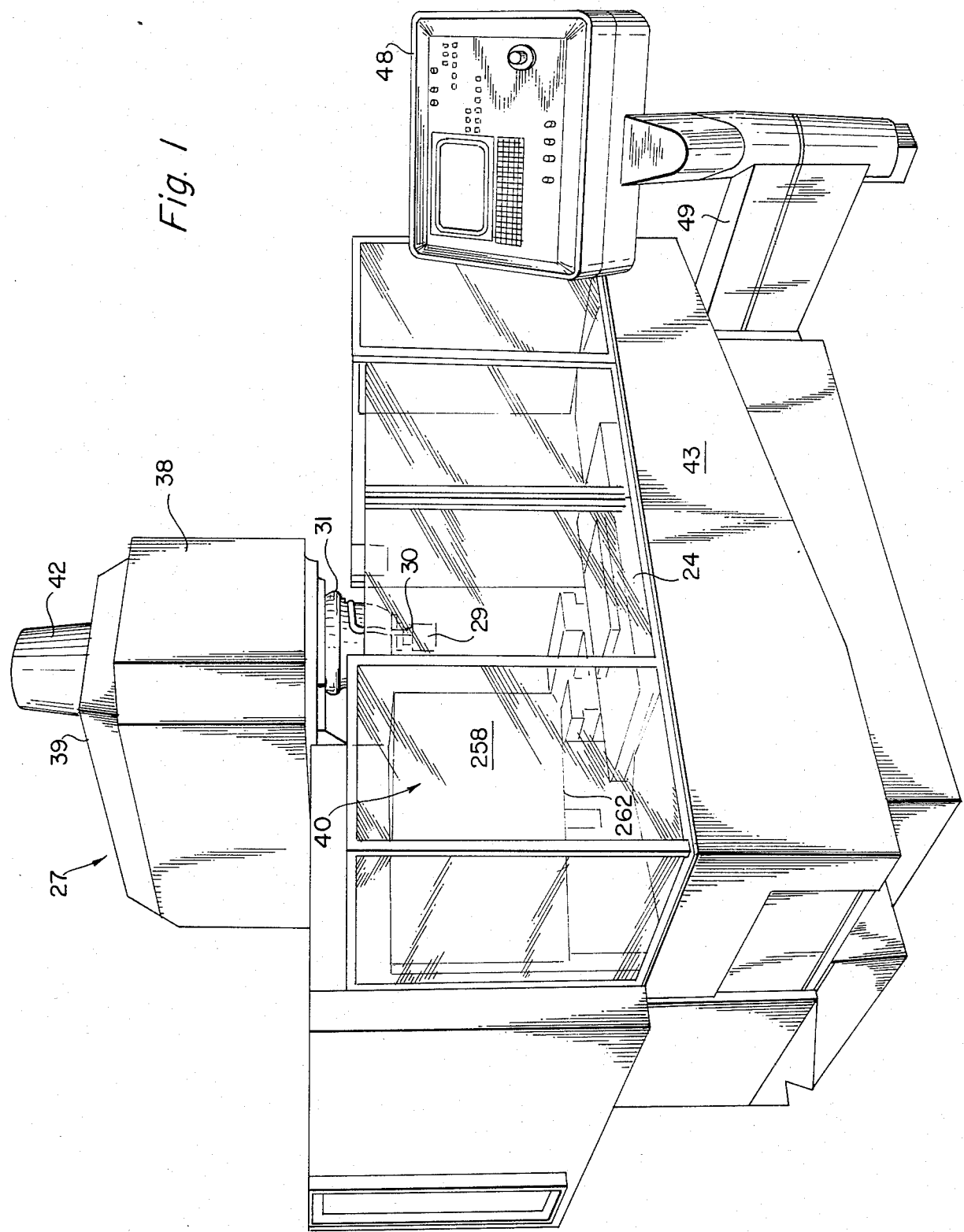
FIG. 1 is a front corner perspective view showing an assembled bed machining center incorporating the various features of the present invention.
Figure 4:
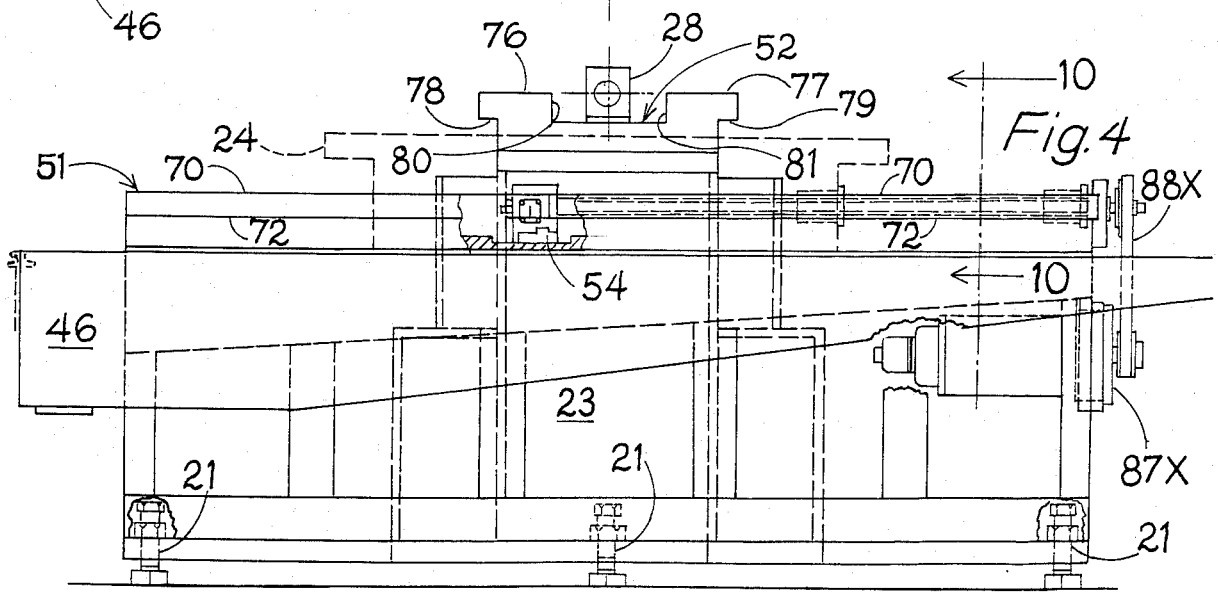
FIG. 4 is a front elevation view of the assembled base and way members shown in FIG. 3.

The bed-type machining center systems of the present invention, exemplified by the installation shown in FIG. 1, provide simple and economical, numerically controlled machining centers providing efficient and economical high-volume machining operations over a long useful life. They are preferably mounted on a sturdy T-shaped machine base 20 standing on three main adjustable supports 21 illustrated in FIGS. 2 and 4. Extending through the base laterally across its front portion is a front tunnel 22 underlying the table, connecting with a forward and rearward extending central tunnel 23 under the column assembly, as shown in FIG. 4. These tunnels 22 and 23 accommodate power cables, hydraulic lines and communication and control cables governing the operation of the machining center of the invention.

Three mutually perpendicular way systems based upon a laterally extending X-axis way member 51, a rearwardly extending Y-axis way member 52 and a vertically extending Z-axis way member 53 provide for precise movement and precision machining operations, achieving mutually perpendicular paths of movement of the table, the column and the head subassemblies as illustrated in FIGS. 2-7.

Figure 10:
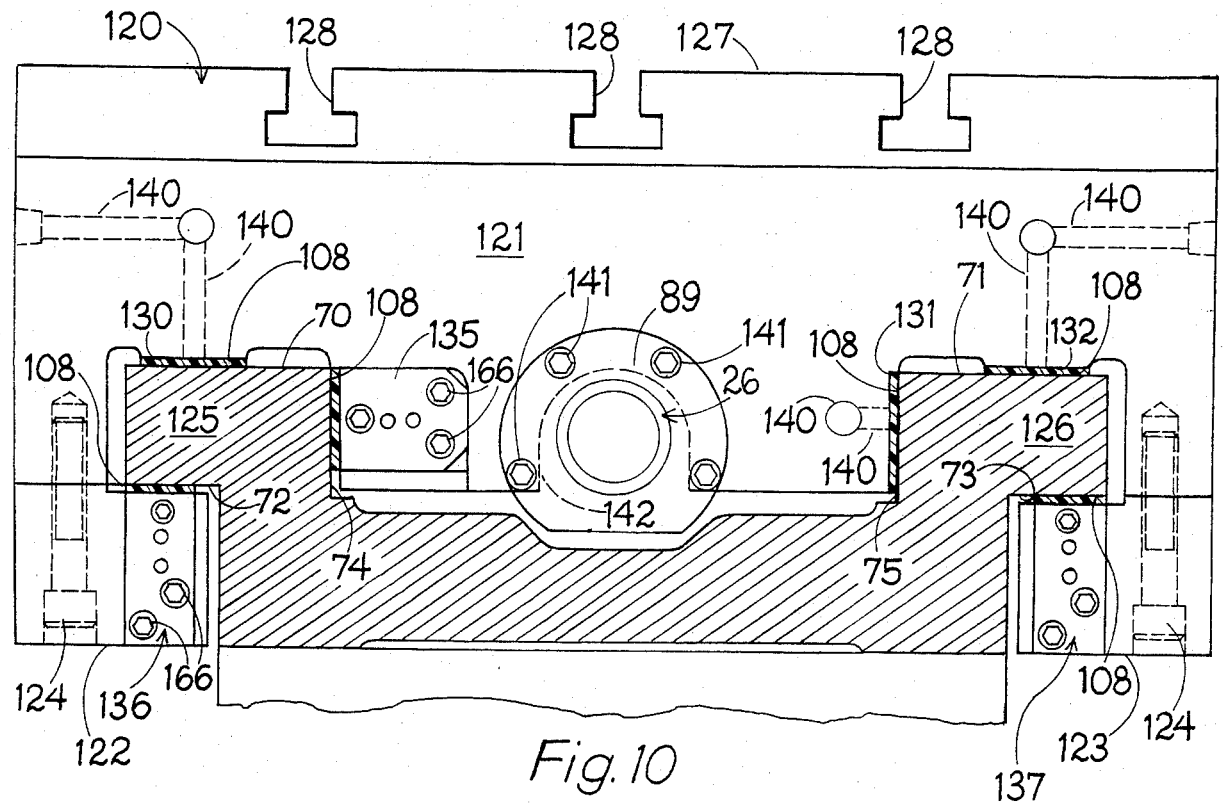
FIG. 10 is an end elevation view partially in section of the integral table and its keeper bar assembly mounted on the horizontal X-axis way member at the front of the bed machining center system of the present invention, taken along the line 10—10 in FIG. 4.

A laterally movable table assembly 24 mounted on the front, horizontal X-axis way member 51 is shown in the enlarged end view of FIG. 10. The table is moved from side to side upon command by a ball screw 26 mounted on its supporting way member 51, having a sliding carriage or drive nut bolted to the end of the table assembly 24 and propelling the table to the right or left along horizontal way member 51 upon actuation of the ball screw 26.

A sturdy upstanding column assembly 27 is mounted on a column keeper or saddle assembly 150 slidably engaged for forward and rearward movement on the rear, horizontal Y-axis way member 52, with the movement of column 27 forwardly and rearwardly being governed by the actuation of a ball screw 28 positioned in the central groove of way member 52 underlying the saddle or column keeper assembly 150.

A vertically movable head assembly 31 carrying the spindle, the drive train and the spindle drive motor is slidably mounted on the vertical, Z-axis way member 53 on the front of column 27, as shown in FIGS. 2 and 7-9. The head assembly 31 is provided with an elevator-style counterweight 32 mounted in the rear of the column 27 connected by elevator-style chains 33, running over front and rear sheaves 34 and 36, joining the head assembly 31 to the counterweight 32 for counterbalanced raising and lowering movement governed by the actuation of a vertical ball screw 37 mounted at the upper end of vertical way member 53 between its laterally extending flanges. Ball screw 37 extends downward inside casting 101, forming the housing of the vertically movable head assembly 31.

Figure 2:
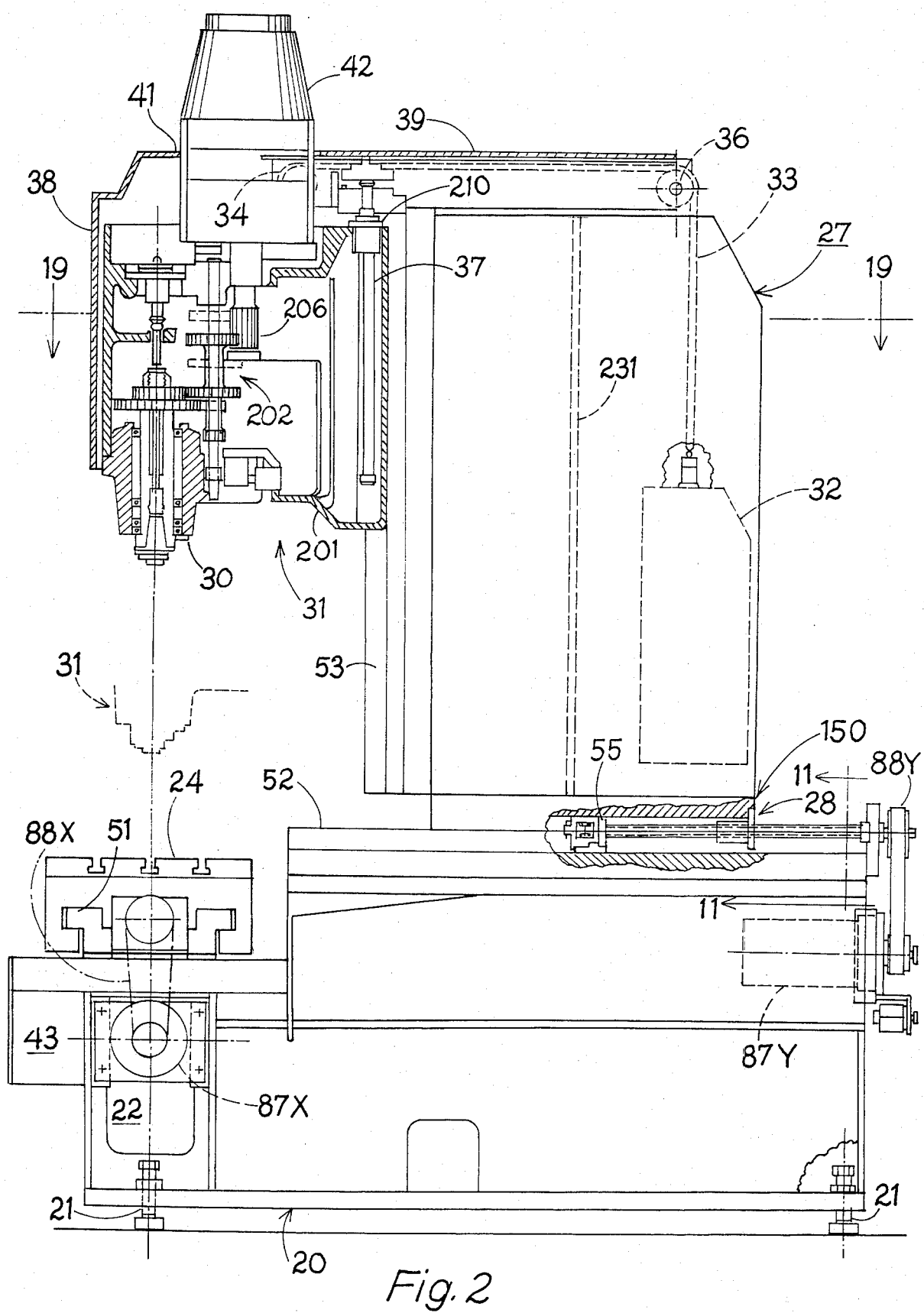
FIG. 2 is a diagrammatic side elevation view of the major movable subassemblies of the bed machining system of FIG. 1 mounted on their mutually perpendicular way members.

As indicated in FIG. 2, the vertical movement of head assembly 31 from its uppermost position shown in FIG. 2 in solid lines to its lowermost position shown in dashed lines occurs behind a shroud or cover 38, formed as a thin enclosure of sheet material encircling the head assembly 31 and having side walls extending rearwardly joined to the upper sides of column 27, with an overlying top panel 39 provided with an enlarged aperture 41 accommodating the upwardly protruding spindle drive motor 42, mounted on the upper end of the vertically movable head assembly 31.

As shown in FIGS. 1-4, the laterally reciprocable table assembly 24 slidably mounted on X-axis way member 51 is provided with an underlying flume tray 43 having a bottom surface 44 sloping downward from right to left as viewed in FIGS. 1 and 4. The flume tray accommodates the high volume sluicing flow of coolant liquid which rapidly carries chips down bottom surface 44 to the sump 46 at the left end of tray 43, where chips are caught at an intake screen 47 over a drain conduit which drains coolant to a circulating pump serving to recycle the sluicing coolant rapidly to the upper end of flume tray 43 for recirculation.

A tool changer subassembly 40 positioned beside the column 27 and behind the left end of table 24 provides a retractable carrousel of 20 different tools, selectively presented for loading in spindle 30 when the carrousel is advanced under the spindle. After tool loading, the changer carrousel is retracted behind a swinging panel keeping chips and coolant out of the changer during machining operations.

An electronic control console 48 is mounted for pivotal movement on a pivoting arm 49, positioning console 48 for angular movement from the front right-hand corner of the machining center shown in FIG. 1, through a substantial arc forward and leftward to a central position directly in front of the tool 29 in spindle 30 depending from head assembly 31.

All three of the ball screw mechanisms 26, 28 and 37 are actuated by drive motors 87. The numerical control systems of these bed machining center units actuate the reversible motors 87 by the predetermined number of revolutions desired, causing the required coordinated translation movement of the table 24, the column 27 or the head assembly 31.

A table driving nut flange 89 of X-axis ball screw 26 is bolted to the central lower right-hand end of table 24, as best seen in FIG. 10. A drive motor 87X, turning timing belt 88X, thus turns X-axis ball screw 26 as shown in FIGS. 3 and 4, driving the nut flange 89 longitudinally along the length of the X-axis ways 51 to cause the desired movement of the table assembly 24.

Figure 3:
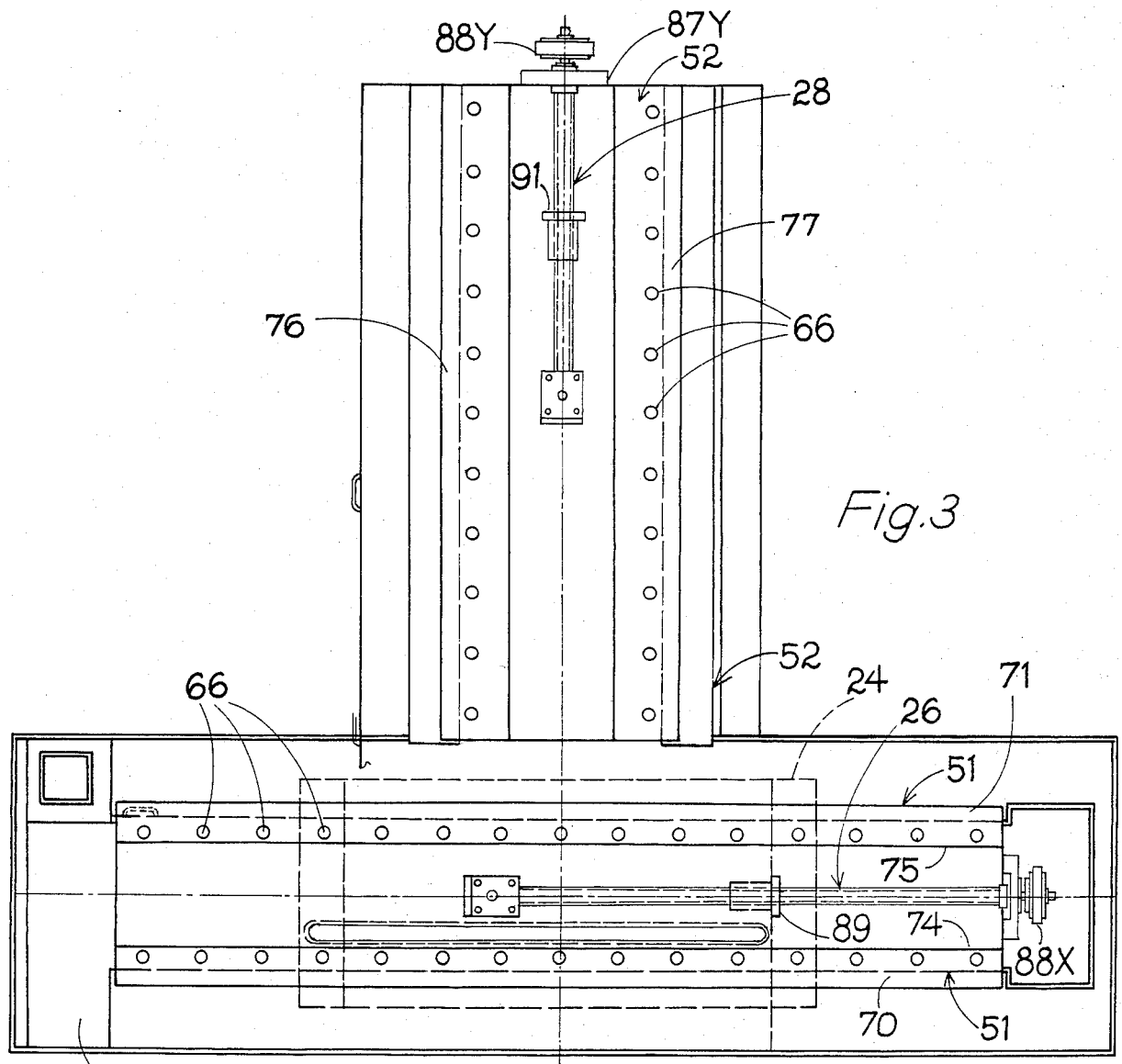
FIG. 3 is a fragmentary top plan view of the mutually perpendicular table-supporting and column-supporting way members mounted on the T-shaped machine base, and incorporating precision preloaded ball screws for moving the table and the column assemblies along the way member.
Figure 11:
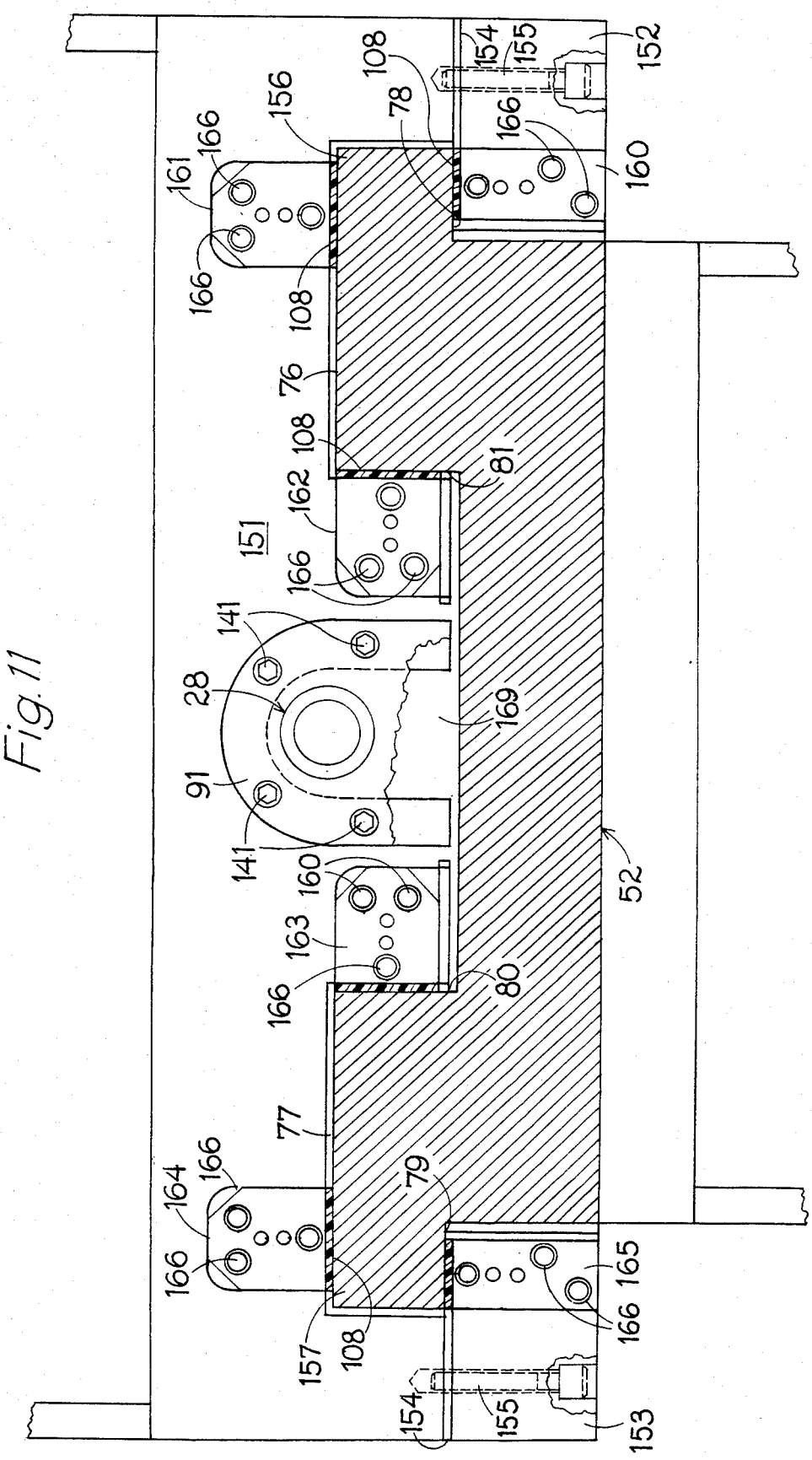
FIG. 11 is a fragmentary rear elevation view partially in section showing the column saddle and keeper bar assembly mounted on the horizontal Y-axis way member positioned on the base of the overall machining center, taken along the line 11—11 in FIG. 2.

Drive motor 87Y, turning timing belt 88Y, causes the Y-axis ball screw 28 to revolve, as indicated in FIG. 3, and the column driving nut flange 91 on the ball screw assembly 28 thereby advances forwardly or rearwardly down the center of the Y-axis ways 52, causing corresponding forward or rearward movement of the column assembly 27, to the rear lower face of which the flange 91 is bolted, as shown in FIG. 11.

Figure 7:
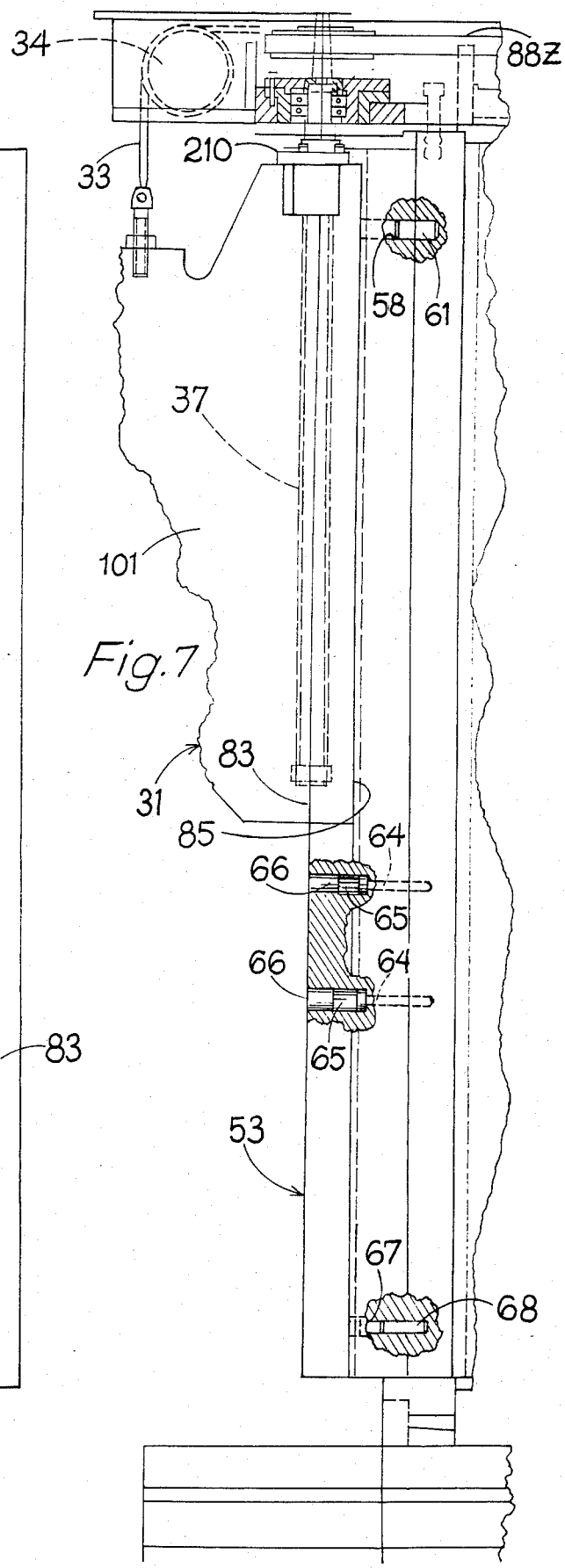
FIG. 7 is a fragmentary side elevation view partially in section of the vertical Z-axis way member illustrated in FIG. 6 and also showing certain associated parts of the overall assembled system.

In similar fashion, the Z-axis ball screw 37 is powered by a similar drive motor 87Z, not shown in the drawings, whose rotation drives a timing belt 88Z shown in FIG. 7 which causes ball screw 37 to revolve. The head driving nut flange 92 on ball screw 37 is bolted to the rear upper face of head assembly 31, as indicated in FIGS. 7 and 8, causing the counterweighted head assembly to move upward or downward along the Z-axis ways 53.

Motors 87 form a high performance and very high resolution DC servo axis drive system, provided with encoder feedback.

Table 24 and the saddle 150 underlying column 27 are each provided with an inverted groove or tunnel in their undersurfaces accommodating their respective ball screws 26 and 28, allowing the table and the column to be easily positioned in sliding engagement with their respective way members 51 and 52. The distal ends of ball screws 26 and 28 are fixed in thrust bearing blocks 54 and 55 bolted to the central grooves of their way members 51 and 52 near the mid-points of these way members. Thermal expansion of the table 24 and column 27, driven by these ball screws, is in large part compensated by thermal expansion of the ball screws themselves, minimizing undesirable thermal expansion effects.

Way System—Installation and Adjustment

Figure 5:
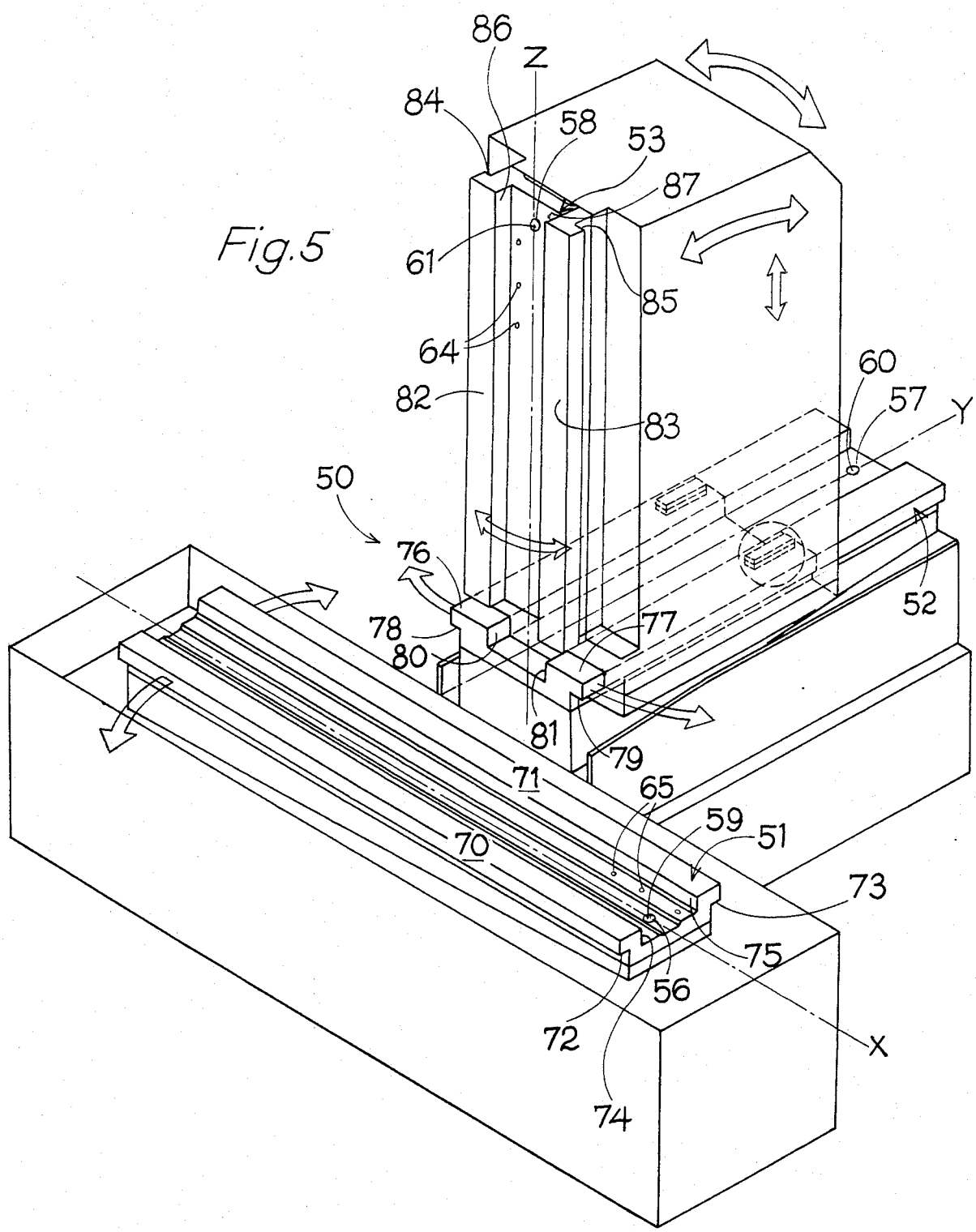
FIG. 5 is a diagrammatic perspective view of the three mutually perpendicular way members with the directions of lateral, rearward and vertical movement of the table, column and head assemblies on their respective way members being identified by the central axes of each of these way members identified as the X-, Y-, and Z-axis, respectively.

In FIG. 5, a diagrammatic view of the way system 50 employed in the bed-type machining system of the present invention is shown. Way system 50 incorporates three independent, integral way members 51, 52 and 53, each of which is a unitary complete member manufactured to precise tolerances. As shown in FIG. 5, the elongated central axis of way member 51 represents the "X-axis" of the bed-type machine system of the present invention, while the elongated central axis of way member 52 represents the "Y-axis", with the elongated central axis of way member 53 representing the "Z-axis".

As will be apparent to one of ordinary skill in this art, it is of critical importance that these three axes are set with maximum precision to be mutually perpendicular to each other since the elongated central axis of each way member defines the longitudinal path along which the keeper and the unit mounted thereto travels. If any one of these three axes is not precisely perpendicular to another axis, the movement, positioning and angular relationship of every machine-controlled operation on a particular workpiece will be inaccurate. Consequently, each way member must be securely mounted to its particular support member in a manner which will assure that the elongated central axes of the way member is precisely mutually perpendicular to the elongated central axis of the other two way members.

In order to achieve the desired mutual perpendicularity in accordance with the present invention, way members 51, 52 and 53 are each initially mounted to their respective support members by a single dowel or support pin. As shown in FIG. 5, way member 51 is constructed with a pin receiving hole 56 which has a central axis precisely perpendicular to the X-axis and the flat, horizontal guide surfaces of way member 51.

Similarly, way member 52 incorporates a pin-receiving hole 57 formed therein having a central axis perpendicular to the Y-axis and the flat, horizontal guide surfaces of way member 52. Way member 53 incorporates a pin-receiving hole 58 formed therein having a central axis perpendicular to the Z-axis and the vertical plane established by the guiding surfaces of way member 53.

Each of the support members to which the way members are mounted incorporate a support pin which is press-fitted in an associated hole with a portion thereof extending outwardly, above the surface of the support member. As a result, way members 51, 52 and 53 are manually positioned in substantially their desired location, with pin-receiving hole 56 of way member 51 telescoped on support pin 59 of its associated support member. As a result, way member 51 is pivotally secured to its supporting base. Similarly, pin-receiving hole 57 of way member 52 is mounted on pin 60 of its associated support member, thereby pivotally securing way member 52 to its support base. Way member 53 is also pivotally secured to its support member by positioning pin-receiving hole 58 on pin 61 of the associated support member.

Figure 6:
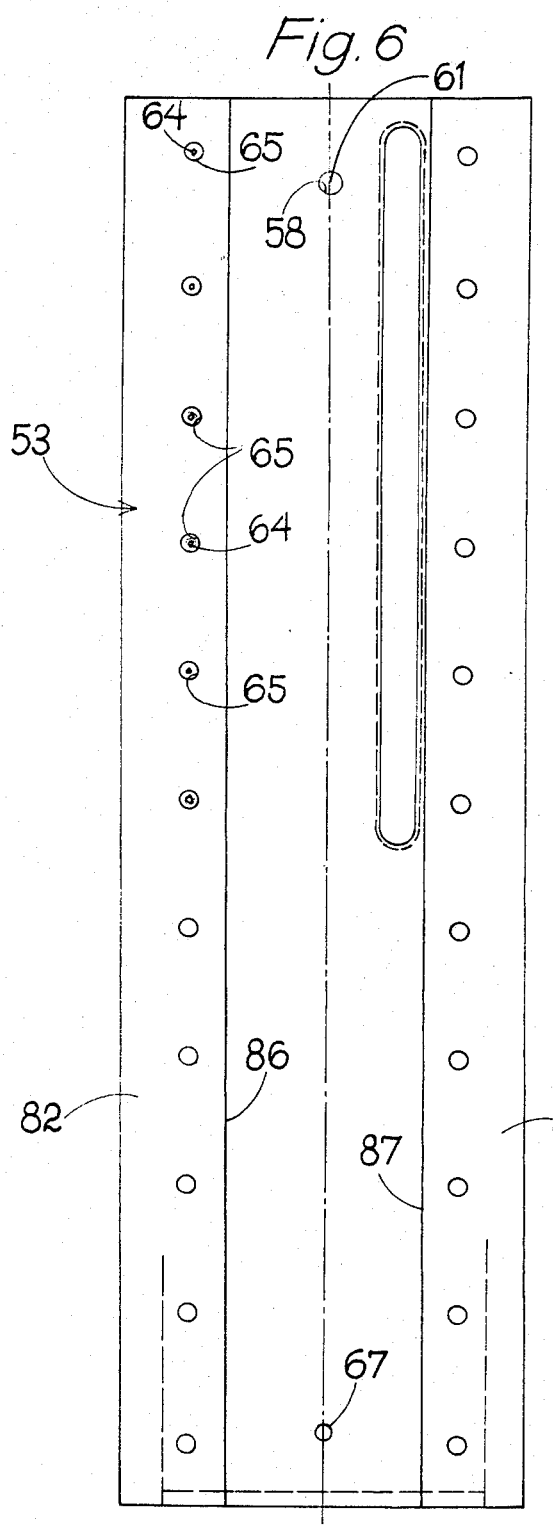
FIG. 6 is a front elevation view of the vertical, head-supporting Z-axis way member.

In FIGS. 6 and 7, details of the pivot pin alignment arrangement and way member mounting and anchoring construction are shown for way member 53. However, since way members 51 and 52 incorporate substantially identical pivot pin alignment arrangements and way member mounting and anchoring constructions, FIGS. 6 and 7 are a representative example for all of the way members.

Once way members 51, 52 and 53 have been mounted to their associated support members by the single support pin positioned precisely along and perpendicular to the central elongated axis of each way member, the way members are capable of pivotal movement about the axis defined by the support pin. Consequently, each way member 51, 52 and 53 can be adjusted with respect to the other way members by moving the end of the way member which is opposite the location of the pin support. By making pivoting side-to-side adjustments of each way member as diagrammatically represented in FIG. 5, way members 51, 52 and 53 are mutually adjusted to be precisely perpendicular to each other, with their elongated central axes having the precise perpendicularity required to assure the desired accuracy.

The particular gauge means employed for establishing precision alignment of way members 51, 52 and 53 can be any of the various means well known in the industry. In particular, electronic scope devices, collimators, or precisely machined gauge blocks have been found to be most advantageous in producing the desired precision alignments.

Once each of the way members has been pivotally adjusted, by movement about the axis defined by pins 59, 60 or 61, into a position which achieves the desired mutual perpendicularity, each way member is securely mounted to its support base. This securement is achieved by inserting a plurality of screw means 64 into the plurality of receiving holes 65 which are formed in each way member and each support member, and threadedly engaging the screw means with the particular support member. Once all of the screw means 64 have been inserted and tightened, each way member 51, 52 and 53 is securely, immovably mounted to its support member in the desired position.

Preferably, receiving holes 63 in the way members are slightly enlarged to allow the way members to be angularly adjusted to attain the desired precise mutually perpendicularity. In general, it has been found that the provision of an adjustment of plus or minus 0.010 inches is sufficient to achieve the desired results. However, other dimensions could be employed without departing from the scope of this invention.

After secure mounting, a final alignment check is made to assure that none of the way members have moved, thereby introducing an error. If any error exists, screw means 64 are removed from the way member which needs adjustment and the adjustment is made in the manner described above. Once in position, screw means 64 are reinserted in receiving hole 65 and threadedly engaged with the support member to securely mount the way member to its support.

As shown in FIG. 7, the installation of way members 51, 52 and 53 is completed by inserting a plug member 66 into hole 65 after screw means 64 have been secured in position. Preferably, a preformed nylon plug member 66 is employed and is mounted in hole 65 substantially flush with the outer surface of the way member. In this way, hole 65 and screw means 64 are protected from accumulation of oil, dirt and grease.

The mounting of way members 51, 52 and 53 to their support members is preferably finalized by inserting a locater pin along the elongated central axis of each way member at the opposite end from the supporting pivot pin. As best seen in FIGS. 6 and 7, which depict way member 53 for illustrative purposes, a hole 67 is provided through way member 53 at the end opposite pin 61 and hole 58. Hole 67 is extended through way member 53 into the underlying support member by drilling and reaming a new hole into the support member, using hole 67 in the way member itself as a drill guide. Then, locater pin or dowel 68 is inserted into hole 67 accurately positioning way member 53 relative to its support member.

With the presence of locater pin 68 securely mounted in position, the precisely aligned orientation of way member 53 is quickly and easily repeated, if way member 53 must ever be removed for any purpose. With pins 61 and 68 securely mounted in their particular receiving holes in the support member, way member 53 can be unscrewed, whenever work on way member 53 becomes necessary, and quickly and easily repositioned in its precise orientation by merely placing pin 61 in receiving hole 58 and pin 68 in receiving hole 67. In order to eliminate any potential misalignments, receiving hole 58 preferably has a greater diameter than hole 67.

The installation of way members 51 and 52 is completed in the identical manner described above, with a locating pin being secured in each of these other way member at the end thereof opposite from the support pin. As a result, way members 51 and 52 can also be removed, and subsequently quickly and easily replaced in their precise locations.

By employing the way member installation and alignment of the present invention as detailed above, way members 51, 52 and 53 are not only quickly and easily installed in position with their mutual perpendicularity controlled and assured; the way members are also capable of being fabricated as a complete unitary structure, without requiring any expensive, time-consuming machining or "scraping-in" during installation. In addition, since each of the three way member 51, 52 and 53 is constructed in its entirety as a single unitary component, the requisite flatness and mutually perpendicularity of the guiding surfaces thereof are also assured since all guiding surfaces are formed with co-operating alignment and precision as part of the manufacturing process used in making the unitary way members. As a result, prior art difficulties typically encountered in aligning and installing multi-component way members are eliminated.

As shown in FIGS. 3-5, way member 51 incorporates flat, elongated, top guiding surfaces 70 and 71. Guide surfaces 70 and 71 are constructed, machined and ground to be precisely flat, defining the identical first horizontal plane.

In addition, way member 51 also incorporates horizontally extending, flat, elongated, guiding surfaces 72 and 73 which are also machined and ground to be precisely flat. Surfaces 72 and 73 are also constructed to define in the identical second horizontal plane, with that plane being precisely parallel to the first horizontal plane defined by surfaces 70 and 71. As a result, lower elongated horizontal flat surface 72 is precisely parallel to upper horizontal, elongated, flat surface 70. Similarly, lower elongated, horizontal, flat surface 73 is precisely parallel to upper, elongated, flat horizontal surface 71.

Finally, way member 51 incorporates flat, elongated vertical guiding surfaces 74 and 75 which are constructed to be precisely parallel to each other and preferably precisely perpendicular to the horizontal plane defined by guiding surfaces 70 and 71, and the horizontal plane defined by guiding surfaces 72 and 73. In addition, guide surface 74 preferably intersects guide surface 70 at precisely ninety degrees, while guide surface 75 and guide surface 73 are also precisely at ninety degrees to each other.

Way member 52 is constructed in a manner substantially identical to way member 51, incorporating upper, flat, elongated, horizontally-extending guiding surfaces 76 and 77 which define the same, identical horizontal plane. Lower, elongated, horizontal flat guiding surfaces 78 and 79 are constructed to define the identical horizontal plane, with that plane being precisely parallel to the plane defined by upper guiding surfaces 76 and 77. Finally, way member 52 also incorporates flat, elongated, vertically-extending guiding surfaces 80 and 81 which are constructed precisely parallel to each other and define planes which are precisely perpendicular to the horizontal planes defined by guiding surfaces 76 and 77 and guiding surfaces 78 and 79. In addition, guide surfaces 76 and 80 intersect at precisely ninety degrees, while guide surfaces 77 and 81 also intersect at precisely ninety degrees.

Way member 53 is constructed in a substantially identical manner incorporating similar surfaces as way members 51 and 52. However, these surfaces have a vertical orientations. As shown in FIGS. 5-7, way member 53 incorporates outer, flat, vertically-extending guiding surfaces 82 and 83 which are precisely aligned to define the identical vertical plane. Way member 53 also incorporates inner, vertically-extending flat guiding surfaces 84 and 85 which are precisely parallel to surfaces 82 and 83 and define a single additional plane parallel to the plane defined by surfaces 82 and 83.

Finally, way member 53 incorporates vertically-extending flat elongated guiding surfaces 86 and 87 which are precisely parallel to each other, and define parallel planes precisely perpendicular to the planes defined by surfaces 82 and 83 and surfaces 84 and 85. In addition, guide surfaces 82 and 86 intersect at precisely ninety degrees, while guide surfaces 83 and 87 intersect at precisely ninety degrees.

With this construction, each way member 51, 52 and 53 establishes a single path of travel defined by the elongated central axis of the way member, with this path of travel being controlled by the mutually perpendicular, co-operating guiding surfaces formed therein. In addition, all of these precise angular relationships and precisely flat, parallel surfaces are all constructed during the manufacture of the way members and, once so constructed, are not changed or altered in any way during installation. Instead, the precisely aligned surfaces of each way member become the guide surfaces of the bed-type machining system by merely mutually aligning the way members and securing the way members to their support members.

Keeper Constructions

The bed-type machine system of the present invention incorporates a plurality of gib packs on each of the three mutually perpendicular axes in order to obtain precisely aligned adjustment of each keeper as mounted to its particular way member. The bed-type machine system of the present invention overcomes prior art constraints and drawbacks by employing a unique keeper construction in combination with a unique gib pack arrangement and constructions. As is fully disclosed below, by employing the gib pack arrangement and keeper construction of the present invention, the travel path of each keeper assembly along its particular way member is precisely controlled and fully adjustable to attain precise movement of the keeper along the precisely aligned travel path, while also providing for the adjustability of each keeper assembly, when required, to compensate for wear.

In addition, the present invention also incorporates a unique method for manufacturing the camming blocks incorporated in each gib pack assembly. As is more fully detailed below, this unique construction method assures that any adjustment of the camming blocks produces precisely aligned movement in only the desired direction, without introducing any angular misalignments or changes in surface contact.

By referring to FIGS. 8 through 11, along with the following detailed disclosure, the keeper construction and associated gib pack arrangement of the present invention employed on each of the three mutually perpendicular axes can best be understood. In referring to these Figures and the following detailed disclosure, one end of each keeper assembly is fully detailed. However, a substantially identical construction is employed at the opposite end of each keeper assembly and, unless specifically discussed, the opposite end of each keeper assembly should be assumed to comprise an identical structure as the end shown in the Figures and detailed below.

In FIG. 8, way member 53, which controls the Z-axis movement of the bed-type machine system of the present invention, is shown along with head keeper assembly 100 securely mounted in sliding engagement therewith. Head keeper assembly 100 incorporates a head-supporting casting 101 and two cooperating, elongated clamping bars 102 and 103.

Head-supporting casting 101 incorporates three, elongated keeper aligning platforms or surfaces 104, 105, and 106 formed on the upper end along the rear surface thereof. In the preferred embodiment, a high load factor, low friction, bearing material strip 108 is mounted on each of the keeper aligning surfaces 104, 105 and 106. By securing strips 108 on each of the keeper-aligning surfaces, continuous, trouble-free, sliding engagement of surfaces 104, 105 and 106 along way member 53 is attained.

As shown in FIG. 8, bearing material strip 108 on surface 104 of casting 101 is in sliding engagement with guiding surface 82 of way member 53. Similarly bearing material strip 108 on surface 105 of casting 101 is in sliding engagement with guiding surface 87 of way member 53, and bearing material strip 108 is mounted to surface 106 of casting 101 to achieve sliding engagement with guiding surface 83 of way member 53. In this way, the desired low friction sliding engagement of surface 104, 105 and 106 with way member 53 is attained.

In order to further enhance the controlled adjustability of the bed-type machining system of this invention as well as assure continuous low friction, sliding ease of keeper assembly 100 along the way member 53, head casting 101 of keeper assembly 100 also incorporates a gib pack assembly 110 which is securely bolted to casting 101 of keeper assembly 100. In addition, keeper assembly 100 incorporates two additional gib pack assemblies 111 and 112, which are mounted to clamping bars 102 and 103, respectively. In this way, keeper assembly 100 is quickly and easily securely mounted to way member 53 by first positioning head-supporting casting 101 along way member 53 and then bolting elongated bars 102 and 103 to casting 101 by bolt means 113. Once bars 102 and 103 are bolted in place, keeper assembly 100 is in its final, secured, embraced engagement with way member 53.

Gib pack assemblies 110, 111 and 112 are each independently secured to keeper assembly 100 by bolt means 166. The gib pack assemblies of the present invention achieve a unique combination by securing a strip 108 of a high load factor, low friction bearing material on the single surface of each gib pack which is slidingly engaged with the guide surfaces of the way member. In this way, the entire head keeper assembly 100 is securely mounted to way member 53, in a manner which provides precise alignment, as will be further amplified below, with the only surfaces contacting way member 53 being the surfaces of the low friction, bearing material strips 108. Clearly, the use of high load factor, low friction, bearing material strips greatly enhances the operation and longevity of the present system through reduced wear, avoidance of metal-to-metal sliding contact, and the attainment of optimum, easily controlled sliding contact between the keeper assembly and the way member, with sliding friction maintained at a minimum.

In the preferred embodiment, gib pack assembly 110 incorporates a strip 108 of bearing material mounted thereto which is in sliding engagement with guiding surface 86 of way member 53. Gib pack assembly 111 incorporates a strip 108 of bearing material mounted thereto which is in sliding engagement with guiding surface 84 of way member 53, while gib pack assembly 112 incorporates a strip 108 of bearing material mounted thereon which is in sliding engagement with guiding surface 85 of way member 53.

As is apparent from the preceding description, keeper assembly 100 peripherally surrounds a major portion of way member 53 and is securely engaged therewith for controlled sliding engagement along the guiding surfaces thereof. In addition, in order to attain the desired complete sliding engagement, both the top rear end and the bottom rear end of the keeper assembly must be engaged with way member 53. As a result, the gib pack construction and surface contact arrangement detailed above in reference to the upper rear surface of keeper assembly 100 with way member 53 also represents the identical assembly employed at the bottom rear of keeper assembly 100, wherein the mirror image of the assembly shown in FIG. 8 is found.

As shown in FIG. 9, which is a cross-section taken along section line 9—9 through the entire keeper assembly 100, the cooperating, substantially identical, aligned gib pack assembly 112A is slidingly engaged with guide surface 85 of way member 53 along one end thereof, while cooperating gib pack assembly 112 is slidingly engaged with guide surface 85 of way member 53 along the opposed end thereof. Similarly, elongated flat keeper aligning surface 106A is in sliding engagement with guide surface 83 of way member 53 along the opposite end from surface 106.

Elongated clamping bars 102 and 103 have lengths substantially identical to the length of head-supporting casting 101 for secure bolted engagement therewith. Head-supporting casting 101 is preferably constructed as a single cast part with keeper aligning surfaces 104, 105 and 106, as well as the substantially identical corresponding surfaces along the bottom rear of casting 101, being machined to the desired flatness prior to the installation of bearing material strips 108 on each surface. In addition, surfaces 104 and 106 are machined flat and to be in precisely the same plane, along with the corresponding surfaces at the base of casting 101. Surface 105 is machined flat and to define a plane which is precisely perpendicular to the plane defined by surfaces 104 and 106.

As briefly discussed above, casting 101 is mounted to way member 53 with clamping bars 102 and 103 being bolted to the rear flanges of head casting 101. As a result, a head keeper assembly 100 is achieved which peripherally surrounds flange 107 of way member 53, defined by flat guiding surfaces 82 and 84, as well as flange 109 of way member 53 defined by guiding surfaces 83 and 85. This dual flange secure engagement is further enhanced by the sliding engagement of head keeper assembly 100 with guiding surfaces 86 and 87 of way member 53, since the securing forces required to provide the sliding engagement of strips 108 on surface 105 and gib pack assembly 110 are perpendicular to the securing forces employed in embracing flanges 107 and 109 of way member 53. In this way, a securely mounted, fully embraced and engaged head keeper assembly 100 is achieved with all undesirable shifting movement completely eliminated.

In order to further enhance and assure maximum, low friction sliding movement of head keeper assembly 100 along way member 53, the present invention also provides for lubrication to be delivered directly to each and every surface of all strips 108 of bearing material which are in sliding engagement with the guide surfaces of way member 53. As shown in FIGS. 8 and 9, lubrication delivery passageways 119 are formed in head keeper assembly 100 and extend from an inlet portal to each of the head aligning surfaces 104, 105, 106, as well as to each of the gib pack assemblies 110, 111, and 112. Strips 108 of bearing material incorporate a cooperating hole 172 which is aligned with lubrication delivery passageway 119 or 170 to deliver the lubrication directly to the surface thereof in sliding contact with way member 53.

As shown in FIG. 9, in order to achieve the desired lubrication of the surfaces of strips 108 on each of the gib pack asemblies in sliding engagement with way member 53, the camming blocks forming a part of each gib pack assembly incorporate lubrication carrying passageways 170, which are aligned with passageways 119 of keeper assembly 100. Although two parallel passageways 170 are shown in each gib pack assembly, it has been found that a single passageway is sufficient to deliver the lubrication required. As a result of this construction, low friction slidability of the keeper assembly along the way member is provided.

In FIG. 10, way member 51, which defines the X-axis, is shown with table keeper assembly 120 securely mounted in sliding engagement therewith. Table keeper assembly 120 incorporates a table forming base 121 and elongated way clamping bars 122 and 123.

In the preferred embodiment, table-forming base 121 comprises a single, unitary casting which is mounted to way member 51 with elongated way clamping bars 122 and 123, which preferably have a length substantially equal to the overall length of base 121, being secured to the bottom flanged surface of base 121 by bolt means 124 to peripherally surround and securely embrace way member 51. In this way, flange 125 of way member 51 which is defined by guiding surfaces 70 and 72 and flange 126 of way member 51 which is defined by guiding surfaces 71 and 73 are surrounded by table keeper assembly 120 for sliding engagement therealong.

Table-forming base 121 preferably comprises a single, unitary casting which is machined to achieve the precisely desired shape and high toleranced surfaces. In particular, workpiece mounting surface 127 is machined to be precisely flat with clamping T-slots 128 also being machined to achieve the desired precise shape and tolerances. In preparing base 121 for sliding engagement with way member 51, keeper aligning surfaces 130 and 132 are machined, with precision, to the maximum flatness obtainable, as well as to be aligned with each other in the identical horizontal plane. In addition, the horizontal plane defined by keeper aligning surfaces 130 and 132 is controlled to be precisely parallel to workpiece mounting surface 127. Surface 131 is machined, with precision, to be the maximum flatness obtainable, as well as to define a plane precisely perpendicular to the plane defined by surfaces 130 and 132. In this way, once strips 108 of a high load factor, low friction, bearing material are mounted to keeper aligning surfaces 130, 131, and 132, assurance is provided that the sliding movement of base 121 along guiding surfaces 70 and 71 of way member 51 will provide uniform, continuous, trouble-free, low friction movement of workpiece mounting surface 127 in a plane which is precisely parallel to the plane defined by guiding surfaces 70 and 71 of way member 51.

Table keeper assembly 120 comprises an elongated, support to which a particular workpiece is mounted for the machining operations. In order to assure easy movability of table keeper assembly 120 and the workpiece mounted thereto, table keeper assembly 120 is in sliding engagement with way member 51 along the keeper aligning surfaces and gib packs which form a part of keeper assembly 120. As is fully discussed above, these keeper aligning surfaces and gib packs are positioned at both ends of keeper assembly 120, thereby fully supporting table keeper assembly 120 and providing the desired movability. For purposes of illustration, FIG. 10 and this detailed disclosure fully discusses the construction at one end of keeper assembly 120. However, keeper assembly 120 incorporates a substantially identical construction at the opposite end thereof, with the opposite end comprising substantially a mirror image of the end discussed below and shown in FIG. 10.

The construction of table keeper assembly 120 in accordance with the present invention to attain the desired adjustable perfectly aligned sliding engagement with way member 51 is completed by the incorporation of gib pack assemblies 135, 136, and 137. Gib pack assembly 135 is bolted to support base 121 by bolt means 166. Gib pack assembly 136 is bolted to elongated clamping bar 122 by bolt means 166, and gib pack assembly 137 is bolted to elongated clamping bar 123 by bolt means 166.

As discussed above in reference to the gib pack assemblies mounted to head keeper assembly 100, gib pack assemblies 135, 136 and 137 each comprises a strip 108 of a high load factor, low friction, bearing material securely mounted thereto in order to form the surface in direct sliding contact with the guide surfaces of way member 51. As a result, table keeper assembly 120 is securely mounted to way member 51, in a manner which provides precise adjustable alignment, as will be detailed below, with the only surfaces contacting way member 51 comprising the low friction bearing material. Consequently, table keeper assembly 120 achieves an optimum, easily controlled, sliding engagement with way member 51, with the sliding friction therebetween being maintained at a minimum, while also providing reduced wear, avoidance of metal-to-metal sliding contact, and inherent longevity.

As shown in FIG. 10, gib pack assembly 135 incorporates a strip 108 of bearing material to provide the sliding engagement along guide surface 74 of way member 51. Gib pack assembly 136 incorporates strip 108 of bearing material which is in sliding engagement with guide surface 72 of way member 51, while gib pack assembly 137 incorporates strip 108 of bearing material to provide the sliding engagement along guide surface 73 of way member 51.

In order to further enhance and assure maximum, low friction sliding movement of table keeper assembly 120 along way member 51, the present invention also provides for lubrication to be delivered directly to each and every surface of all strips 108 of bearing material which are in sliding engagement with the guide surfaces of way member 51. As shown in FIG. 10, lubrication delivering passage ways 140 are formed in table keeper assembly 120 and extend from an inlet portal to each of the keeper aligning surfaces 130, 131, and 132 as well as to each of the gib pack assemblies 135, 136 and 137. Strips 108 of bearing material incorporate a cooperating hole which is aligned with lubrication delivery passageway 140 or 170 to deliver the lubrication directly to the surface thereof in sliding contact with way member 51.

In order to achieve the desired lubrication of the surfaces of strips 108 on each of the gib pack assemblies in sliding engagement with way member 51, the camming blocks forming a part of each gib pack assembly incorporate lubrication carrying passageways 170 which are aligned with passageways 140 of keeper assembly 120, in a manner similar to that shown in FIG. 9. As a result of this construction, added low friction slidability of the keeper assembly along the way member is provided.

As previously discussed, way member 51 incorporates a ball screw assembly 26 mounted thereto which is employed to move the entire table assembly 120 between its various positions along the X-axis. In order to achieve this precise, controlled movement of table assembly 120, ball screw assembly 26 incorporates table driving nut flange 89. As shown in FIG. 10, in order to attain the desired control movement of table assembly 120, nut flange 89 is bolted to one end of table assembly 120 by bolt means 141.

In addition to providing the desired precisely controlled movement of table assembly 120, the construction employed in the present invention also provides ease of assembly and installation. As shown in FIG. 10, table assembly 120 incorporates a horseshoe-shaped tunnel 142. As a result, support base 121 of table keeper assembly 120 is easily positioned on way member 51 with ball screw assembly 26 previously securely mounted in position. Then, in order to provide the requisite interconnecting engagement between table assembly 120 and ball screw assembly 26, table driving nut flange 89 is bolted directly to table assembly 120 to provide the necessary controlled interengagement therewith. As a result of this construction, assembly time is substantially reduced and construction efficiency is further enhanced.

In FIG. 11, the column keeper assembly 150 is shown partially surrounding and securely engaging way member 52 for sliding movement therealong. Column keeper assembly 150 incorporates a column supporting block or saddle 151 and clamping bars 152 and 153. Elongated clamping bars 152 and 153 are securely mounted to the bottom flanged surface 154 of column support block 151 by bolt means 155.

Way member 52 incorporates a flange 156 which is principally defined by parallel, flat guide surfaces 76 and 78. Similarly, on the opposed side thereof, way member 52 incorporates a flange 157 which is principally defined by flat, parallel guide surfaces 77 and 79.

When elongated clamping bars 152 and 153 are securely mounted to bottom flange surface 154 of saddle 151, flanges 156 and 157 of way member 52 are peripherally surrounded and slidingly engaged with keeper assembly 150. In addition, keeper assembly 150 is also securely slidingly engaged with guiding surfaces 80 and 81, which are perpendicular to surfaces 76, 77, 78 and 79. In this way, keeper assembly 150 is maintained in a secure, fixed position with the only path of movement available for keeper assembly 150 being the Y-axis as defined by way member 52.

As shown in FIG. 11, column keeper assembly 150 incorporates six independent gib pack assemblies 160, 161, 162, 163, 164, and 165. In the preferred embodiment of this construction, saddle 151 incorporates gib packs 161, 162, 163 and 164, while elongated clamping bar 152 incorporates gib pack 160, while elongated clamping bar 153 incorporates gib pack 165.

The incorporation of six independent gib pack assemblies on the column keeper assembly comprises a unique advance in the industry and attains results previously unattainable with prior art constructions. No keeper assembly is known which employs six independent gib pack assemblies at each end thereof.

By employing six, independent gib pack assemblies on each end of column keeper assembly 150, the entire column of the bed-type machining system of this invention is capable of being adjusted or "fine-tuned" in a plurality of different directions. As diagrammatically shown in FIG. 5 by double-headed arrows, the proper adjustment of the gib pack assemblies allows the column to be raised, lowered, rocked or tilted forwardly and rearwardly, shifted from side to side, and pivoted about its central axis to both sides.

In particular, by simultaneously adjusting gib pack assemblies 161 and 164 and the corresponding gib packs at the front end of column keeper assembly 150, the entire column is raised or lowered. By simultaneously adjusting gib pack assemblies 161 and 164, the entire column is tilted forwardly, while the simultaneous adjustment of the gib pack assemblies corresponding to gib pack assemblies 161 and 164 causes the entire column to be tilting rearwardly.

By adjusting gib pack 163 and the corresponding gib pack at the opposed end thereof, the entire column is moved horizontally to one side, while the adjustment of gib pack assembly 162 and its corresponding gib pack assembly at the opposed end thereof causes the entire column assembly to move horizontally to the opposite side. Furthermore, by adjusting gib pack assembly 162 with the gib pack corresponding to gib pack 163 at the opposed end thereof, horizontal angular pivoting of the entire column is achieved in one direction. Angular pivoting in the opposite direction is achieved by adjusting gib pack assembly 163 and the opposed gib pack assembly corresponding to gib pack assembly 162.

Of course, gib pack assemblies 160 and 165 would be adjusted to compensate for any movement in gib pack assembly 161 and 164 in order to assure that the entire column keeper assembly 150 is securely engaged with way member 52 for sliding engagement therewith.

In addition, by providing column keeper assembly 150 with the six independent gib pack assemblies, saddle 151 is not subjected to the high tolerance machining of keeper aligning surfaces, as is required in the constructions detailed above in reference to the table keeper assembly 120 and the head keeper assembly 100. As a result, the difficult, expensive and cumbersome machining operations of the prior art which are required to attain the requisite precision and alignment of keeper aligning surfaces on saddle 151 are all completely eliminated, and the requisite precision adjustments are made quickly and easily using the gib pack assemblies incorporated in column keeper assembly 150. In this way, the entire column is quickly and easily adjusted, with exact precision, to be in the precisely desired orientation and securely mounted to way member 52 to provide accurate movement of the tool head along the Y-axis.

As with the gib pack assemblies previously discussed, each of the gib pack assemblies 160, 161, 162, 163, 164, and 165 incorporates a strip 108 of a high load factor, low friction bearing material mounted to one of the camming blocks thereof, with strips 108 providing the only surfaces which are slidingly engaged with the guide surfaces of way member 52. In this way, the entire column keeper assembly 150 is securely mounted to way member 52 in a manner which provides precise alignment and orientation, with the entire column keeper assembly 150 being easily controllably moved along way member 52, with the sliding friction therebetween maintained at a minimum. Consequently, prior art wear problems are eliminated, metal-to-metal sliding contact is eliminated and, instead, longevity and optimum, easily controlled sliding engagement is achieved.

As shown in FIG. 11, gib pack assembly 160 with its low friction bearing material strip 108 is slidably engaged with guide surface 78 of way member 52. Gib pack assembly 161 with its low friction bearing material strip 108 is in sliding engagement with guide surface 76 of way member 52. Gib pack assembly 162 with its associated low friction bearing material 108 is slidably engaged along guide surface 81 of way member 52. Gib pack assembly 163 with its associated low friction bearing material 108 is in sliding engagement with guiding surface 80 of way member 52. Gib pack assembly 164 with its low friction bearing material strip 108 is slidably engaged with guide surface 77 of way member 52, and gib pack assembly 165 with its associated low friction bearing material strip 108 is in sliding engagement with guide surface 79 of way member 52.

As is readily apparent from this construction, column keeper assembly 150 peripherally surrounds a major portion of way member 52 and is in secure sliding engaged contact with way member 52 in a manner which achieves complete, secure sliding engagement along mutually perpendicular planes. Consequently, column keeper assembly 150 achieves the desired, precisely controlled sliding movement along way member 52 in only the single Y-axis path desired for its operation.

Figure 12:
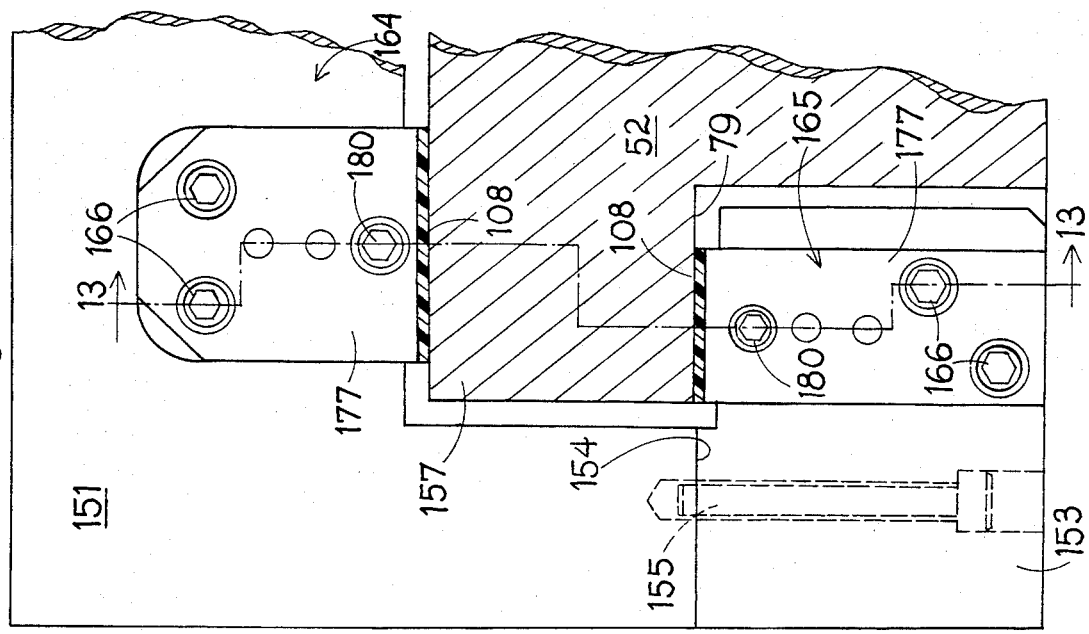
FIG. 12 is a fragmentary enlarged view, partially in section, of the left side of the assembled parts shown in FIG. 11 illustrating the opposed adjustable gib pack units embracing the upper and lower parallel surfaces of the way member in sliding engagement for adjustable orientation of the column, taken along the line 11—11 in FIG. 2.
Figure 13:
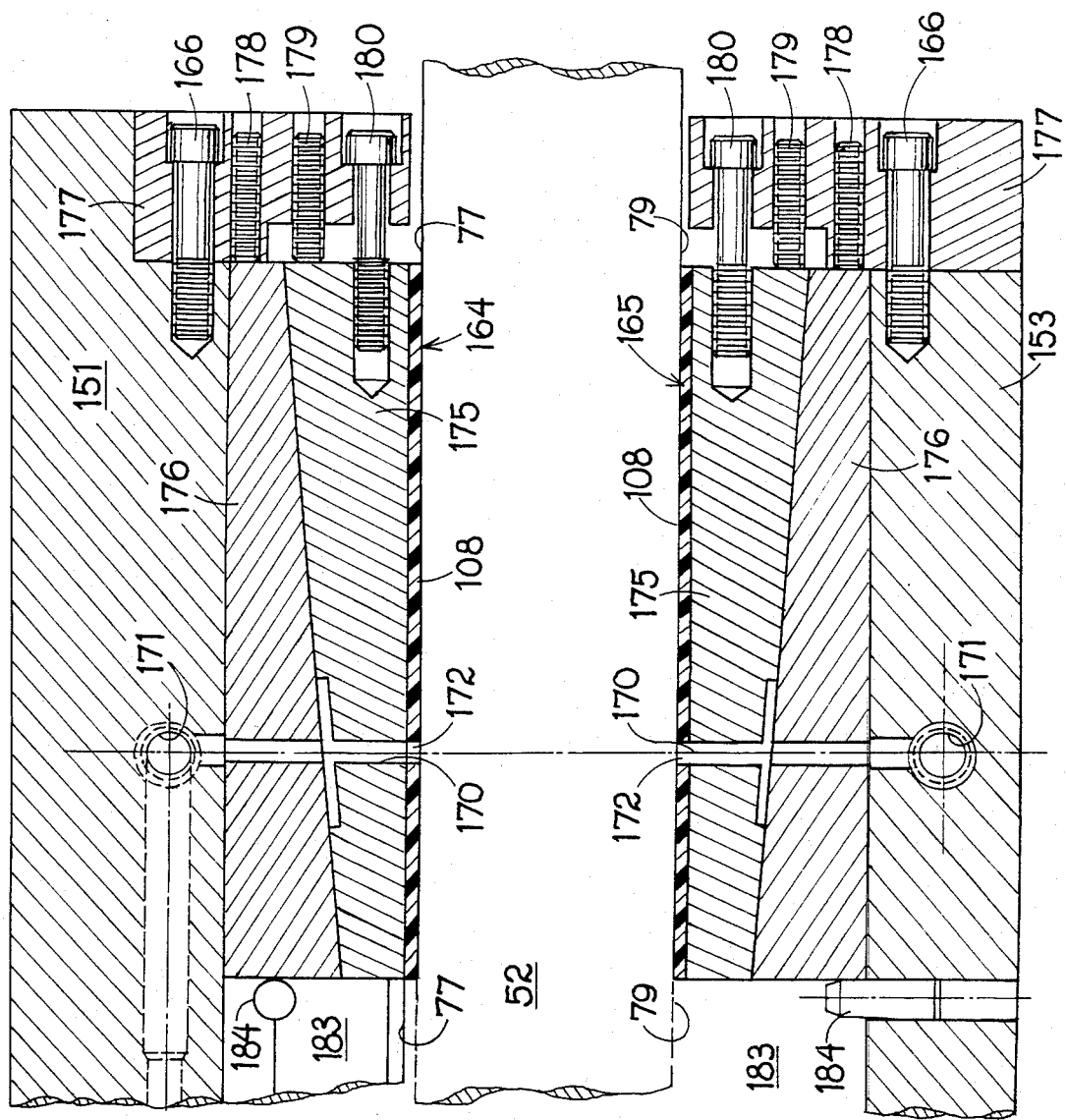
FIG. 13 is a fragmentary sectional side elevation view of the opposed gib packs and related way and keeper members shown in FIG. 12 taken along line 13—13 in FIG. 12.

As shown in FIGS. 11-13, the gib pack assemblies employed in the present invention comprise two alternate shapes. However, all of the gib pack assemblies of the present invention incorporate the same cooperative parts and operate in an identical fashion. As shown, the gib pack assemblies mounted to saddle 151 comprise a width which is greater than the overall width of the gib pack assemblies secured to the clamping bars. This size variation is required in view of the narrower guiding surface along which the gib pack assemblies secured to the clamping bars slidingly engage. However, in operation and in adjustment, all of the gib pack assemblies employed in the present invention are identical.

As shown in FIG. 11, another feature of the present invention is the incorporation of an elongated tunnel 169 formed in saddle 151 extending from the rear to the front thereof. Elongated horseshoe-shaped tunnel 169 allows the column assembly to be mounted to way member 53 with ball screw 28 secured thereon by merely positioning horseshoe-shaped tunnel 169 over the ball screw assembly 28 with the plurality of gib packs supportingly maintaining column keeper assembly 150 in the desired position along the guide surfaces of way member 52.

Column keeper assembly 150 is then quickly and easily drivingly engaged with ball screw assembly 28 by bolting nut flange 91 of ball screw assembly 28 to the rear surface of saddle 151 by bolt means 141. In this way, after the gib pack assembly of column keeper assembly 150 are adjusted, in the manner detailed below, column keeper assembly 150 and the entire column of this system secured thereto is controllably driven forwardly and rearwardly along the desired Y-axis by the movement of ball screw 28.

As shown in FIGS. 11-13, gib pack assemblies 160-165 incorporate lubrication carrying passageways 170 which cooperate with lubrication carrying passageways 171 formed in column keeper assembly 150. In addition, bearing material strip 108 mounted to each gib pack assembly incorporates a cooperating hole 172 to assure the delivery of the lubrication to the surface of strip 108 which is slidingly engaged with way member 52. In this way, the sliding friction which exists between bearing material 108 of the gib pack assembly and the guide surfaces along which the gib pack assembly and its associated strip 108 is slidingly engaged is maintained with a film of lubrication, thereby further enhancing and providing continuous, trouble-free, low friction operation.

The particular orientation or positioning of lubication carrying passageways 170 and 171 are a matter of design choice. However, although these positions and their orientations may vary, the critical requirement is the efficient delivery of lubrication to the surface of bearing material strip 108 which is in sliding engagement with the guide surfaces of the way member. In addition, this disclosure and the representation shown in FIG. 13 are also representative of the lubrication delivery system employed for delivering lubrication through the gib pack assembly mounted to table keeper assembly 120 and head keeper assembly 100.

Gib Pack Assembly Construction and Operation

As best seen in FIGS. 12 and 13, wherein gib pack assemblies 164 and 165 are shown, each gib pack assembly incorporates two slidably engaged camming blocks 175 and 176, and a cooperating anchor plate 177. In addition to bolt means 166, anchor plate 177 incorporates a block securing screw 178 and two position adjusting screws 179 and 180, while camming block 175 incorporates a deep screw-receiving hole 181.

As shown in FIG. 13, only block securing screw 178 and position adjusting screw 179 are threadedly engaged with plate 177. The gib pack assembly fastening bolt 166 and the position adjusting screw 180 are retained in plate 177 by countersunk holes 182, but are not threadedly engaged with plate 177.

In both the preceding and following descriptions of the gib pack assemblies, it is important to note that the construction, installation and adjustment procedures herein detailed are common for all gib pack assemblies employed in the bed-type machining system of the present invention. Consequently, although references may be made to a particular gib pack assembly, these references should be interpreted as illustrative and common to all gib pack assemblies employed in the present invention, unless otherwise stated.

The gib pack assemblies employed in the present invention are quickly and easily mounted to the desired keeper assembly by inserting cooperating camming blocks 175 and 176 in the accommodating cavity 183 formed in the keeper assembly. However, as shown in FIG. 13, prior to inserting the gib pack assembly in cavity 183, a block holding pin 184 is press-fitted into a receiving hole with a portion of pin 184 extending outwardly from the receiving hole into cavity 183. Once pin 184 is secured in position, the gib pack assembly is merely inserted into receiving cavity 183 and bolted to the keeper assembly by bolt means 166.

Once the gib pack assemblies are securely bolted to the particular keeper assembly, the gib pack assemblies are ready for adjustable movement in order to attain the precise, desired, orientation of the keeper assembly on the particular way member. The quick and easy adjustment procedure which is achieved by the gib pack assemblies of the present invention can best be understood by referring to FIGS. 14, 15 and 16 along with the following detailed discussion.

Figure 14:
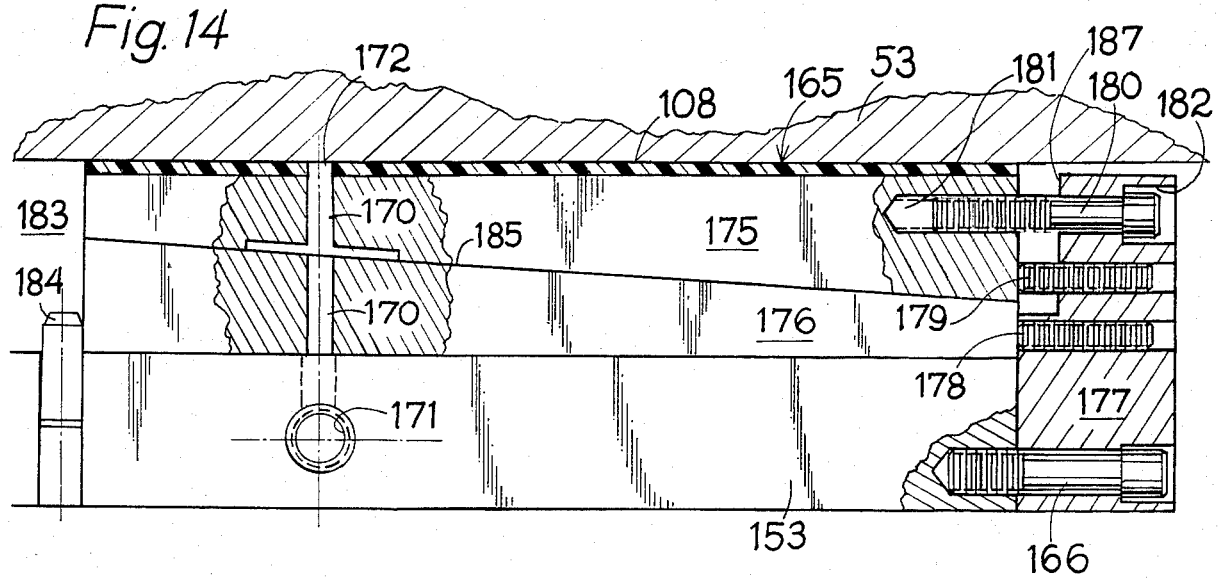
FIGS. 14, 15 and 16 are corresponding fragmentary side elevation views, partially in section, showing a gib pack assembly of the kind illustrated in FIGS. 11-13 in different slidably adjusted positions of the mating cam blocks therein.
Figure 15:
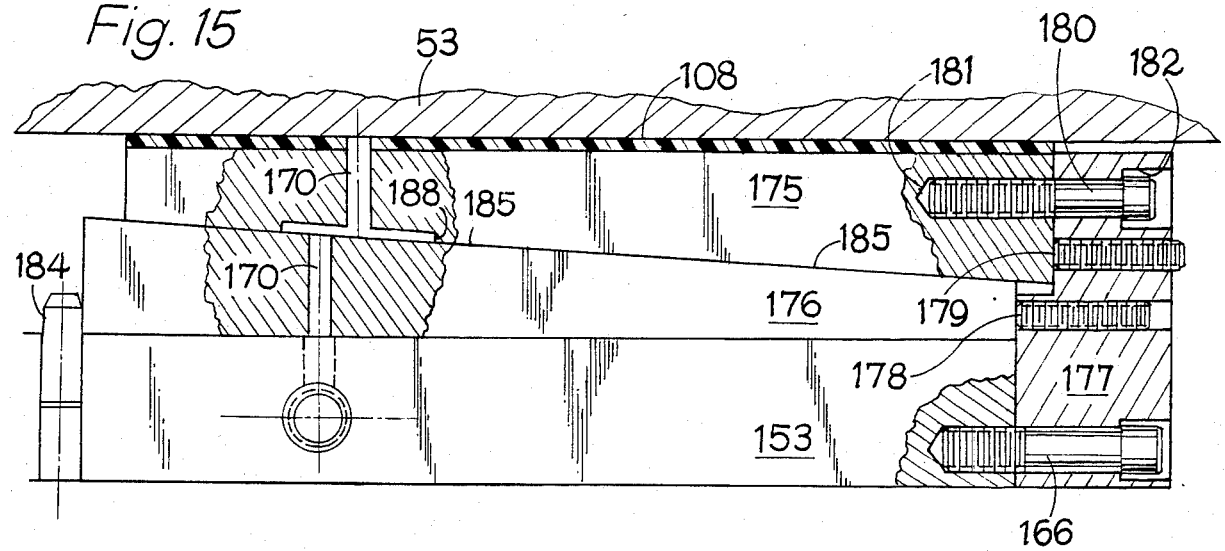
Figure 16:
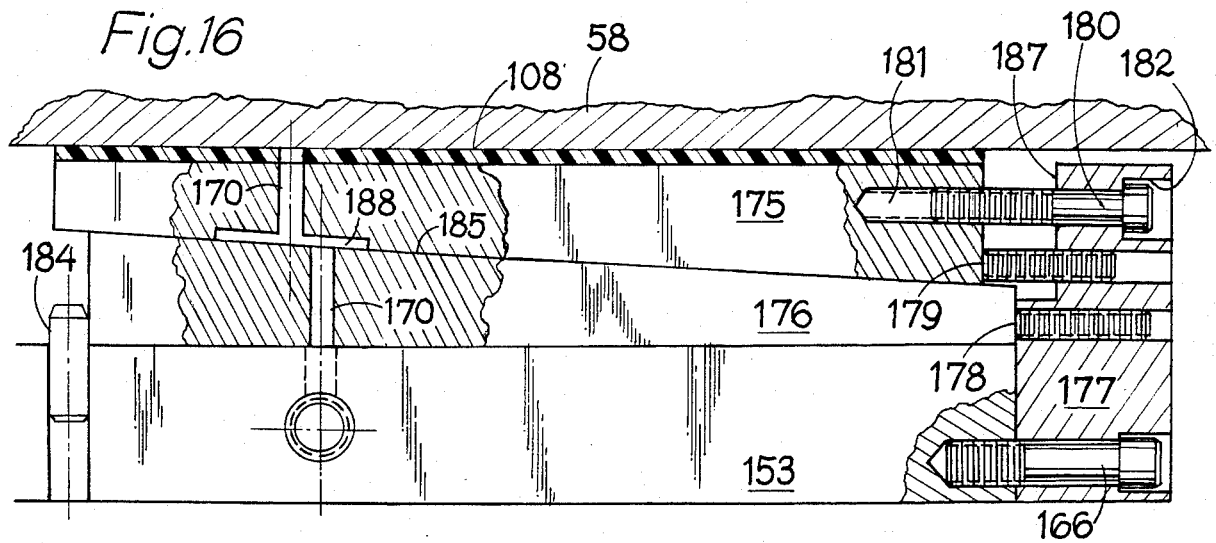

In FIGS. 14, 15 and 16, a typical gib pack assembly is illustrated in the various adjusted positions. For purposes of illustration only, gib pack assembly 165 is shown mounted to way member 53.

In FIG. 14, gib pack assembly 165 is shown installed in cavity 183 with bolt means 166 threadedly engaged with the keeper assembly. The first step in assuring the secure mounted engagement of the gib pack assembly with its keeper assembly, is to threadedly advance block securing screw 178, in order to cause block 176 to advance towards holding pin 184. Since anchor plate 177 securely abuts clamping bar 153 of keeper assembly 150, the rotational advance of block securing screw 178 against camming block 176 causes camming block 176 to slidingly advance towards pin 184 until block 176 is in secure abutting engagement with pin 184. When completed, block 176 is immovably fastened between pin 184 and securing screw 178. With block 176 sandwiched between pin 184 and screw 178, gib pack assembly 165 is ready for adjustable movement.

By comparing FIGS. 14 and 15, the adjustment of gib pack assembly 165 to achieve a reduction in the vertical height of camming blocks 175 and 176 can best be understood. As shown therein, in order to reduce the vertical height of camming blocks 175 and 176, position adjusting screw 180 is rotated to advance further into screw receiving hole 181 of camming block 175.

Since anchor plate 177 is securely affixed to clamping bar 153 of keeper assembly 150, the rotational movement of adjusting screw 180, with its head securely retained in the base of countersunk hole 182, the rotational advance of adjustment screw 180 into hole 181 causes camming block 175 to be drawn by screw 180 towards plate 177. Since the cooperating mating surfaces 185 of camming blocks 175 and 176 are angularly disposed in order to facilitate the camming, sliding, movement of block 175 relative to block 176, block 175 moves laterally toward plate 177, until its end surface abuts the inwardly notched, flat surface 187 of plate 177.

As is apparent from a comparison of FIGS. 14 and 15, the movement of camming block 175 from the position shown in FIG. 14 to the position shown in FIG. 15, causes the overall vertical height of camming blocks 175 and 176 to be decreased. In general, an overall, total, vertical height adjustment of about 1/16 inches has been found to be sufficient to achieve the desired results.

The alternate adjustable movement of camming blocks 175 and 176 causes the vertical height thereof to be increased. By referring to FIGS. 14 and 16, this gib pack assembly adjustment can best be understood.

In order to increase the vertical height of camming blocks 175 and 176 from the position shown in FIG. 14, to the position shown in FIG. 16, the first step is to partially withdraw position adjusting screw 180 from its associated receiving hole 181 so that the head of screw 180 extends partially out of countersunk hole 182, as shown in phantom in FIG. 16. Once adjustment screw 180 has been partially withdrawn from hole 181, adjusting screw 179 is rotationally advanced into abutting, driving contact with camming block 175, causing camming block 175 to move away from anchor plate 177. As discussed above, since anchor plate 177 is immovably affixed to the keeper assembly, the rotational advance of adjusting screw 179 forces camming block 175 to advance along the elongated ramp surface 185 of camming block 176, causing the vertical height of camming blocks 175 and 176 to be increased until the desired position is attained.

Since camming block 175 is capable of the controlled, longitudinal side-to-side movement detailed above, camming block 175 also incorporates an elongated channel 188 formed in its ramp surface 185 about passageway 170. As shown in FIGS. 15 and 16, channel 188 assures the continuous desired flow of lubrication to the sliding surface, regardless of the position of camming block 175 relative to passageway 170 of camming block 176.

As is apparent from the preceding descriptions concerning the secure mounted sliding engagement of the keeper assemblies along the three mutually perpendicular way members and the preceding description concerning the adjustability of the gib pack assemblies mounted to each of the keeper assemblies, each keeper assembly is quickly and easily adjusted to attain the desired securely mounted, precisely parallel, sliding engagement with its particular way member. In the preferred embodiment, head keeper assembly 100 and table keeper assembly 120 have their positions along their respective way members maintained in precise alignment principally by the keeper aligning surfaces formed thereon.

As shown in FIGS. 8 and 10, both of these keeper assemblies employ the adjustability of their gib pack assemblies to securely clamp the keeper aligning surfaces to the flanges of the way member to assure secure sliding engagement with the guide surfaces forming the flanges. In addition, the adjustability of the gib pack assemblies, which are mounted to the clamping bars associated with the keeper assemblies, also assures that the desired engagement can be maintained, with wear of the bearing material strips being easily compensated by adjusting the gib pack assemblies.

The gib pack assemblies mounted to the keeper directly adjacent the ball screw drive nut in both the head keeper assemby 100 and the table keeper assembly 120 is adjusted to assure secure sliding engagement with the inside guide surface of its associated way member. The location of this particular gib pack assembly is employed to assure the secure mounted engagement of the keeper assembly with the way member in a manner which will prevent any unwanted lateral side-to-side movement of the keeper assembly and provide mutually perpendicular clamping forces about a major portion of the way member, so that the keeper assembly is capable of movement only along the desired path of travel.

As previously discussed, in the construction of column keeper assembly 150 of this invention, six adjustable gib pack assemblies are employed in order to assure that saddle 151 of column keeper assembly 150 is in the precisely desired position. As is now readily apparent from the preceding description concerning the adjustability of the keeper assemblies, it is readily apparent that the entire column structure of the bed-type machining system of the present invention can be controllably set by changing the vertical height of the clamping blocks of the gib pack assembly in order to attain a column assembly which is slidably engaged along its way member in the precisely desired position. Consequently, by employing the gib pack construction of this invention, accuracy which has previously been incapable of being attained with prior art systems can now be attained in a manner which minimizes high tolerance manufacturing requirements and expensive and time-consuming installation and surface regrinding operations now common in this industry.

The gib pack assemblies of the present invention are capable of providing precise vertical height adjustments without in any way introducing unwanted skewed angular movement or changing of the surface contact between the camming blocks and the components to which they are sandwiched. This precision operation is attained by manufacturing camming blocks 175 and 176 using this unique, novel method. This method of manufacture can best be understood by referring to FIGS. 17 and 18 along with the following detailed disclosure.

By constructing camming blocks 175 and 176 in accordance with the present invention, the desired precision is attained while also providing a manufacturing method which is comparatively inexpensive. In accordance with this unique method, camming blocks 175 and 176 are initially constructed in a conventional manner with a common, cooperating, ramped camming surface 185 formed therebetween. Although prior art manufacturing methods required the ramped camming surface 185 to be formed with great precision in order to attain the desired sliding engagement, this expensive manufacturing step is completely eliminated by employing the method of the present invention.

In the present invention, once camming blocks 175 and 176 have been machined in their overall desired shape and placed in sliding interengagement with each other, threaded holes 190 are formed in the exposed surface 192 of camming block 176, with holes 190 extending through camming block 176 into camming block 175. Then, bolt means 191 is threadedly engaged in each of the holes 190 in order to securely affix camming block 175 to camming block 176, thereby forming, for manufacturing purposes, a single, integral structure.

With camming blocks 175 and 176 securely affixed to each other along their ramped surfaces 185, the parallel, cooperating, flat, opposed surfaces 193 on camming block 175 and 192 on camming block 176 are machined in this integral configuration to obtain surfaces 192 and 193 that are precisely flat and define two precisely parallel planes. Once surfaces 192 and 193 have been machined and ground to attain this desired precisely parallel configuration, surface 193 of camming block 175 is ready to have strip 108 of the bearing material secured thereto.

As a direct result of the construction of camming blocks 175 and 176 as a single, unitary interengaged structure, the requisite precise parallelism and flatness of cooperating surfaces 192 and 193 is assured. Consequently, when bolts 191 are withdrawn from accommodating holes 190 and camming blocks 175 and 176 are installed with the anchor plate 177 to form the gib pack assembly, the adjustable movement of camming block 175 relative to camming block 176 will produce only vertical height adjustments, without any unwanted movement or changing of surface contact being possible. Consequently, the precision previously unattainable in the industry is now attained in a manner which is inexpensive to manufacture, install, and adjustingly achieved.

Bearing material strip 108 is securely affixed to surface 193 of camming block 175 using a suitable adhesive cement well known in the industry. However, an additional novel manufacturing step has been achieved by the present invention in order to provide the desired alignment of strip 108 on surface 193 in a quick and easy fashion, without causing any clogging of lubrication delivery portals 170 in camming block 175. Using the techniques of this invention, dowel plugs or pins 196 are inserted into passageways 170 with a portion of the dowel or pin 196 extending above passageway 170. Then, the cement material is spread along the entire surface 193 of camming block 175 and, once completed, strip 108 is placed on surface 193 with lubrication delivery holes 172 being placed over upstanding dowel pins 196. In this way, bearing material strip 108 is quickly and easily positioned in the precise location on surface 193 while simultaneously protecting passageways 170 and 172 from being filled with cement material and possibly preventing the free flow of lubrication to the surface of strip 108.

Figure 17:
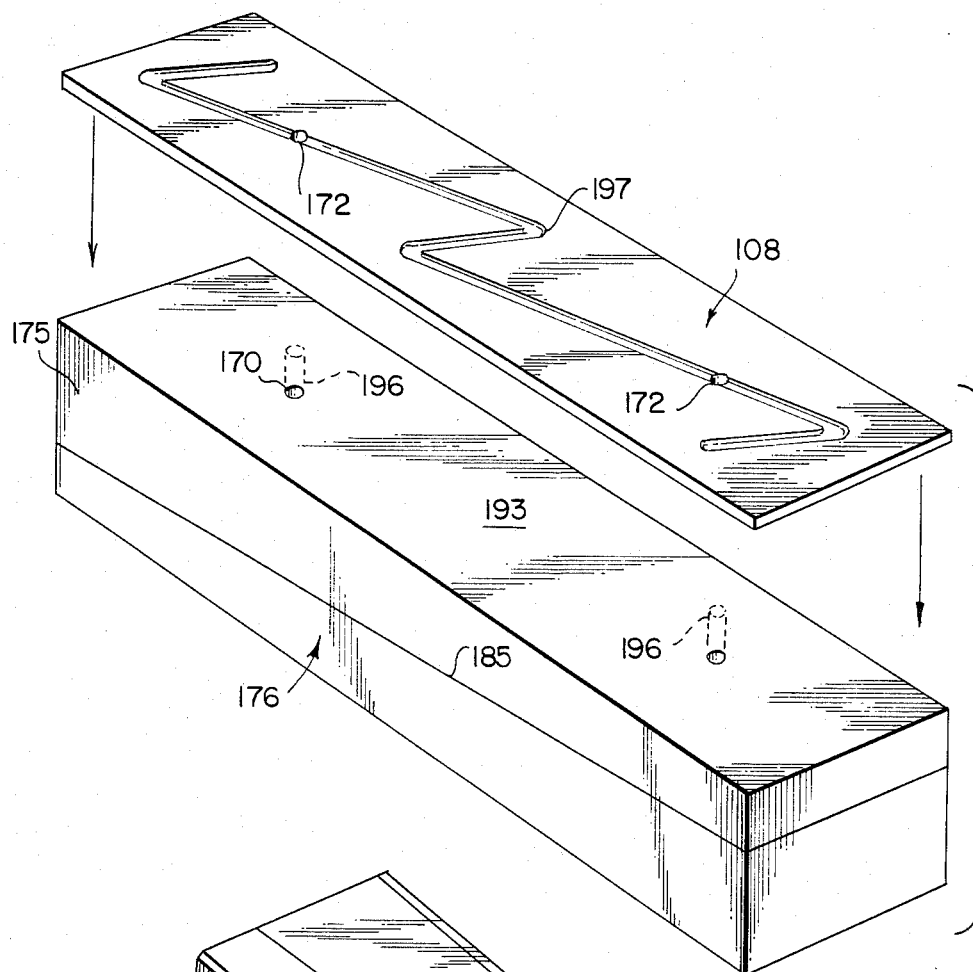
FIG. 17 is an exploded perspective view of a gib pack assembly and its extremely low friction filled polymer surface layer incorporating a zig-zag lubrication groove.
Figure 18:
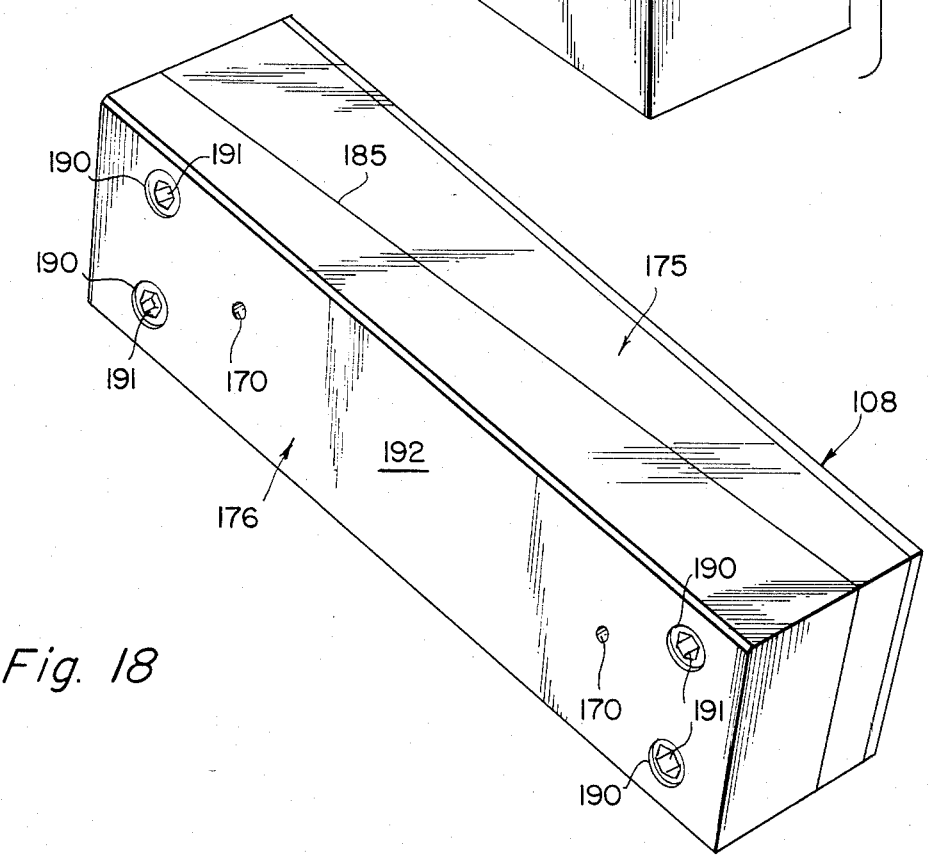
FIG. 18 is a perspective view of the gib pack assembly and low friction polymer layer shown in FIG. 17 in assembled condition and rolled over angularly to expose the bottom of the assembly, showing it temporarily bolted together to facilitate parallel grinding of its two opposite load bearing surfaces.

In addition, in the preferred embodiment, bearing material strip 108 incorporates a slanting Z-groove 197 formed in the top surface thereof which will be in direct sliding engagement with the guide surface of the way members. As shown in FIG. 17, the preferred embodiment of Z-groove 197 is constructed with the short straight segments thereof being slanted or angularly disposed relative to the short, side edges of strip 108. It has been found that by employing this slanted Z-groove, optimum oil distribution and retention throughout the entire length of strip 108 is achieved.

To further enhance and insure the unitary construction of camming blocks 175 and 176 in the mated interengaged, paired fashion discussed above, blocks 175 and 176 are preferably individually coded once they have been bolted together, with identical serial numbers. Consequently, if the blocks are ever separated, there is assurance that the blocks will be reunited prior to installation, thereby assuring the desired precise parallelism.

Throughout the previous discussion, strip 108 has been defined as comprising a high load factor, low friction, bearing material. Although several types of bearing tapes or bearing material strips are available in the marketplace for use in machine ways and gibs, the preferred bearing material employed for strips 108 of the present invention is "Multifil 426" bearing tape manufactured by Garlock Bearings, Inc., a Division of Colt Industries, of Thoroughfare, New Jersey. Garlock's "Multifil 426" tape is specifically developed for sliding applications, such as machine tool ways, and comprises a blend of polytetrafluoroethylene and a combination of fillers incorporated to improve the bearing properties of the base resin. However, although Garlock's "Multifil 426" is preferred, any comparable bearing material strip can be employed with comparable efficacy.

Stress Transmitting Rib Structure

The head assembly 31 and the column assembly 27 are both designed to withstand the substantial loads imposed by machining operations, in order to maintain maximum dimensional stability and perpendicular orientation of the guiding way surfaces to assure precision machining.

Structural stiffness and rigidity are contributed to both of these assemblies by a stiff external housing shell and sturdy internal ribs forming a plurality of cooperating "box beam" structures.

Figure 19:
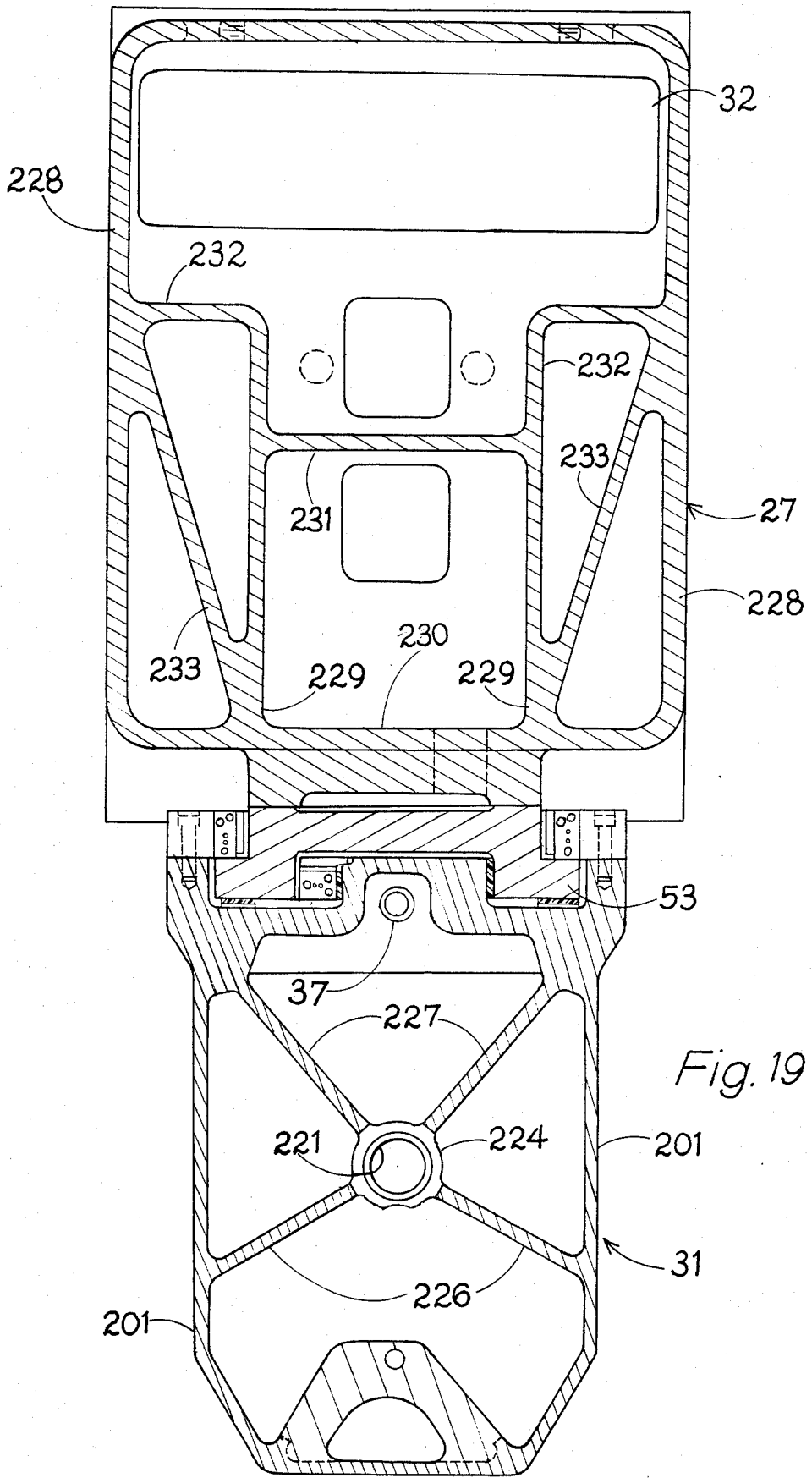
FIG. 19 is a sectional top plan view taken along the line 19—19 in FIG. 2 showing the cooperating internal rib structure of the vertically movable head assembly and the rearwardly slidable column, with the internal ribs incorporated in each of these structures being aligned and positioned to transmit machining loads to the underlying supporting base.
Figure 20:
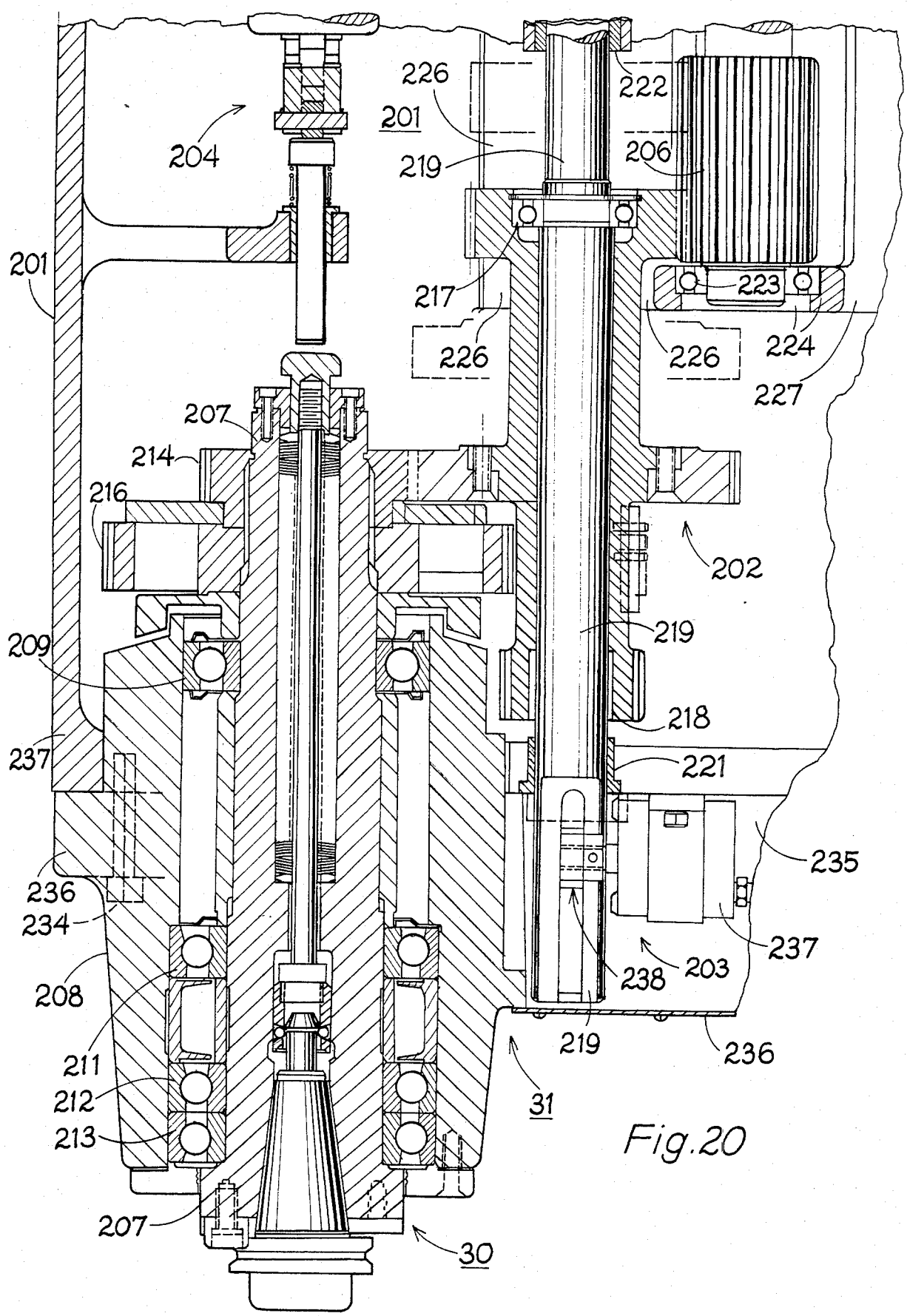
FIG. 20 is a fragmentary cross sectional view of the head assembly illustrated in FIG. 2 showing the removable spindle assembly, the speed changing cluster gear drive, shifting assembly and associated parts.

As shown in FIGS. 19 and 20, the head assembly 31 incorporates an outer shell 201 enclosing the moving parts of the spindle 30, cluster gear 202, gear shifting mechanism 203 and a collet opening cylinder 204.

Cluster gear 202 is driven by a drive pinion 206 on the shaft of the drive motor 42, which is mounted protruding upward above the shell 201 of head assembly 31, as best shown in FIG. 2.

FIG. 19 shows the cooperating internal rib structure of column assembly 27 and head assembly 31. Inside the head assembly, machining loads produced by cutting tools operating on the workpiece mounted on the table assembly 24 are counteracted by heavy ball bearings mounting the collet-carrying spindle 207 of spindle assembly 30 in a sturdy thick-walled spindle housing 208. Three sets of large heavy duty ball bearings 211, 212 and 213 encircle the lower collet end of spindle 207, and a single heavy duty ball bearing set 209 encircles and stabilizes the upper end of spindle 207. All of these bearings 209, 211, 212 and 213 deliver both thrust and radial loads to spindle housing 208. Cutting torque is delivered to the revolving spindle 207 by its high speed drive gear 214, keyed to its upper end and shown engaging the cluster gear 202 in FIG. 20, or by its low speed drive gear 216, which is disengaged when the shiftable cluster gear 202 is in its ower position, as shown in the view of FIG. 20. The cluster gear 202 is preferably mounted on an upper ball bearing 217 and a lower needle bearing 218, endwise shiftable on non-rotating cluster gear shaft 219, which is positioned for vertical sliding movement between its two shifted positions in suitable sleeve bearings 221 and 222 mounted in the housing of head assembly 31, making shaft 219 freely reciprocable vertically between the lower, solid line, high speed position shown in FIG. 20 and the upper, dashed line, low speed position also indicated in FIG. 20.

The lower end of motor drive pinion 206 engaging the upper row of gear teeth on cluster gear 202 is held in a sturdy ball bearing 223 mounted in a central hub 224 sturdily positioned in the central open portion of the head shell 201 by a plurality of radial ribs. These ribs are clearly shown in FIG. 19 as a pair of forward diagonal ribs 226 and a pair of rearward diagonal ribs 227. As clearly shown in the lower portion of FIG. 19 and the upper right-hand corner of FIG. 20, the hub 224 is thus firmly stabilized and securely anchored against axial or radial movement by these four sturdy ribs diagonally spanning the interior of the head assembly shell 201 and extending from the central hub 224 to the peripheral wall of the shell 201 at widely spaced angular orientations. The ribs 226 and 227 thus form with the shell 201 three rigid triangular box beams resisting torsion, bending and any other cutting loads or shock loads imposed upon the assembled structure during operation.

Column Rib Structure

As shown in FIG. 19, column assembly 27 is provided with a sturdy but lightweight internal rib structure well adapted to receive the loads delivered to it by the head assembly 31 through vertical way member 53, and to transmit these loads rearwardly and downwardly to the base of the machine through its supporting Y-axis way member 52. As shown in FIG. 19, the column assembly 27 is provided with a heavy, thick-walled outer shell 228 encircling its periphery and resting directly on and welded to its keeper saddle 150 slidingly engaged with the horizontal way member 52, as shown in FIG. 11.

Positioned directly behind the vertical way member 53 is a roughly square section box beam structure formed by two rearwardly extending ribs 229 joined to the front wall portion 230 of shell 228 and having their rear portions bridged by a transverse rib 231. Ribs 229 extend rearwardly beyond transverse rib 231 and then curve laterally outward, as shown in FIG. 19 where they join the rear central portions of the sidewalls of shell 228. These rearward segments of the ribs 229 thus form angle ribs 232.

An additional sturdy reinforcing rib structure subdividing the generally rectangular box beam formed by the forward corners of shell 228-230 and the ribs 229 and 232 are rearwardly slanting diagonal ribs 233 having their forward ends integrally joining the front of shell portion 230 at its juncture with ribs 229 and having their rearward portions integrally joined to the sidewalls of shell 228 at the junctures with angle ribs 232.

Thus, as shown in FIG. 19, each forward corner of column assembly 27 is formed as a sturdy, double-triangular box beam. Ribs 229-232 are bridged by the transverse rib 231 to form a large central square-section box beam. Behind this reinforcing rib structure is a vertically open well extending up and down the rear portion of the hollow column 27, forming the counterweight chamber within which the head balancing counterweight 32 travels up and down in opposition to the vertical motion of head assembly 31, as indicated in FIG. 2, where the transverse rib 231 is shown extending from top to bottom of column 27 by dashed lines in the central portion of FIG. 2. The other box beam internal ribs of column 27 are omitted from FIG. 2 for purposes of clarity, since they are all clearly indicated in FIG. 19.

The ribs of head assembly 31 and the ribs of column assembly 27 thus cooperate to form a lightweight sturdy stress-transmitting structure analogous to a truss with many groups of triangular members joining together to provide unusual rigidity to the combined structure. The ribs of both head assembly 31 and column assembly 27 may be apertured by the formation of "windows" in a particular location to permit the passage of hydraulic lines, compressed air lines, electrical control cables and the like. This is because the ribs in the head assembly 31 extend vertically over approximately the upper half of the head assembly, thus providing ample stress carrying cross-sectional rib area. Correspondingly, the ribs in column assembly 27 preferably extend vertically over the entire height of the column, thus also providing ample stress carrying cross-sectional rib area in column 27.

Removable Spindle Assembly

The spindle assembly 30 including both spindle 207 and spindle housing 208 are easily removable from the head assembly 31. This is accomplished by the removal of a small plurality of anchoring bolts 234 securing a radial flange 236 of spindle housing 208 to the overlying rim 237 of a spindle receiving opening formed in the lower front portion of the head shell 201. A small cover plate 236 encloses the lower chamber 235 in head assembly 31 in which is a mounted a rotary actuator 237. Rotary actuator 237 actuates a rack and pinion mechanism 238 at the lower end of cluster gear shaft 219 to produce the gear shifting motion of shaft 219 by vertical sliding movement in bearings 221 and 222. Cover plate 236 is also removed when the spindle assembly 207-208 is to be removed from the head assembly 31.

Thus by the removal of a small number of bolts, the entire rotating spindle and stationary spindle housing can be lowered from the head assembly 31 and entirely removed from the machine for prompt and convenient maintenance or replacement. Endwise axial downward movement of the spindle assembly 207-208 slidingly disengages the drive gears 214 or 216 from the cluster gear 202, leaving all remaining parts of the head assembly 31 in position to receive the overhauled spindle assembly or a replacement spindle assembly 207-208, to restore the entire bed machining system of the present invention promptly to full operation.

Ball screw 37 is anchored by bolts to the top plate of column 27, directly under shroud cover 39. The ball screw's nut driver flange 210 is bolted to the upper end of the head shell casting 201. After lowering the head 31 gently onto a suitable temporary support resting on table 24, the ball screw 37 may be unbolted from column 27 and head 31. The successively diminishing radial dimensions of the successive depending portions of ball screw 37 then allow it to be readily withdrawn vertically upward. An overhauled or replacement ball screw 37 may be lowered with equal convenience through the top plate of column 27 into the interior of shell 201, and when re-bolted in position, the sliding head assembly 31 is again fully ready for operation.

Tool Changer Mechanism

Many conventional tool changers use intermediate movable arms with convoluted travel paths and complex linkages, employing mechanical hands to lift, carry and deliver tools in toolholders to the spindle as needed. In the present invention, the tool storage carrousel stores, indexes, and delivers tools and receives tools after use. Single path reciprocating motion between the extended and retracted positions of the carrousel simplifies the mechanism, minimizing cost, wear and losses of precision over the years of operation.

Figure 21:
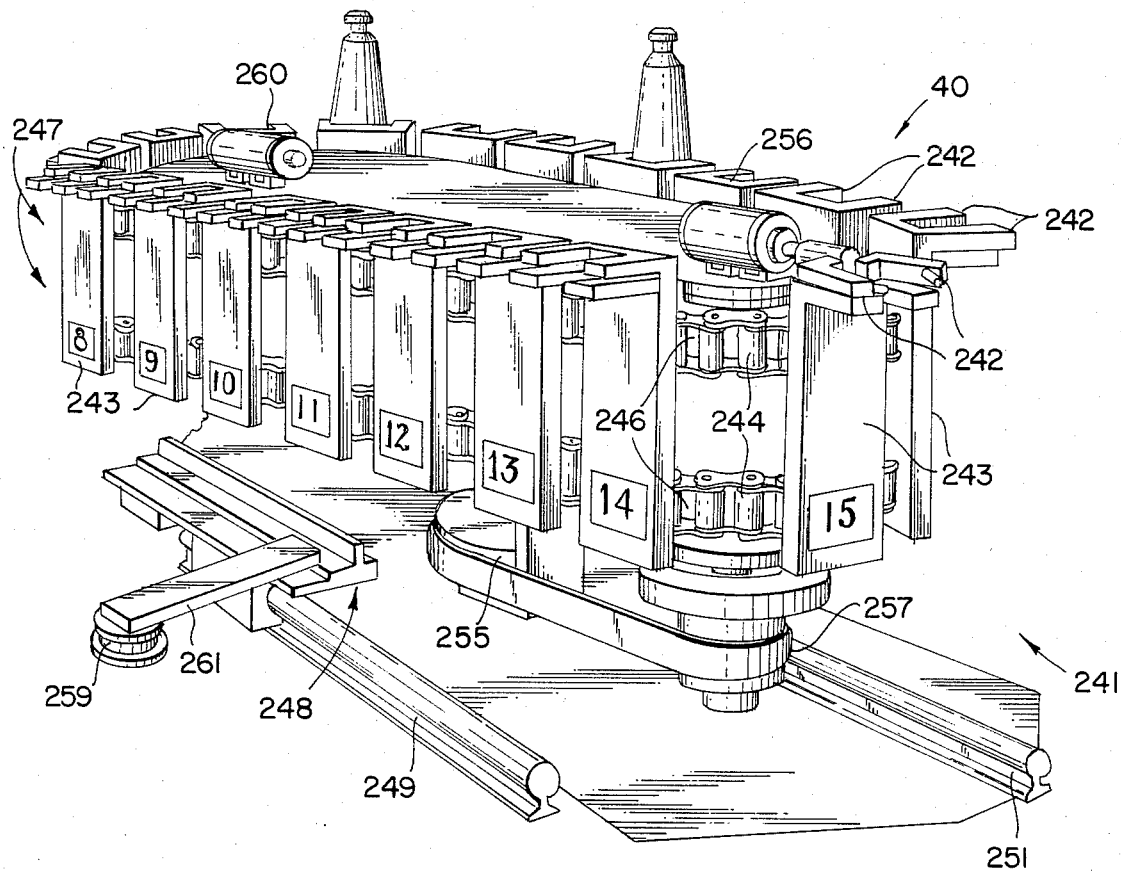
FIG. 21 is a fragmentary perspective view of the tool changer assembly shown in its retracted position inside its housing.

The tool changer assembly 40 shown in FIG. 21 is a carrousel 241 carrying twenty different tools in toolholders held in releasable pairs of tool gripping jaws 242 mounted on tool blocks 243 carried on a pair of endless chains 244. The chains are mounted on a pair of double sprocket wheels, a forward sprocket wheel 246 and a larger rear sprocket wheel 247. The rear sprocket wheel is preferably mounted in an eccentric bearing, movable to adjust chain tension, and both sprocket wheels are mounted for rotation on a carriage 248 which is slidably mounted for diagonal advance and retracting movement along a pair of rails, a short front rail 249 and a longer rear rail 251.

Figure 22:
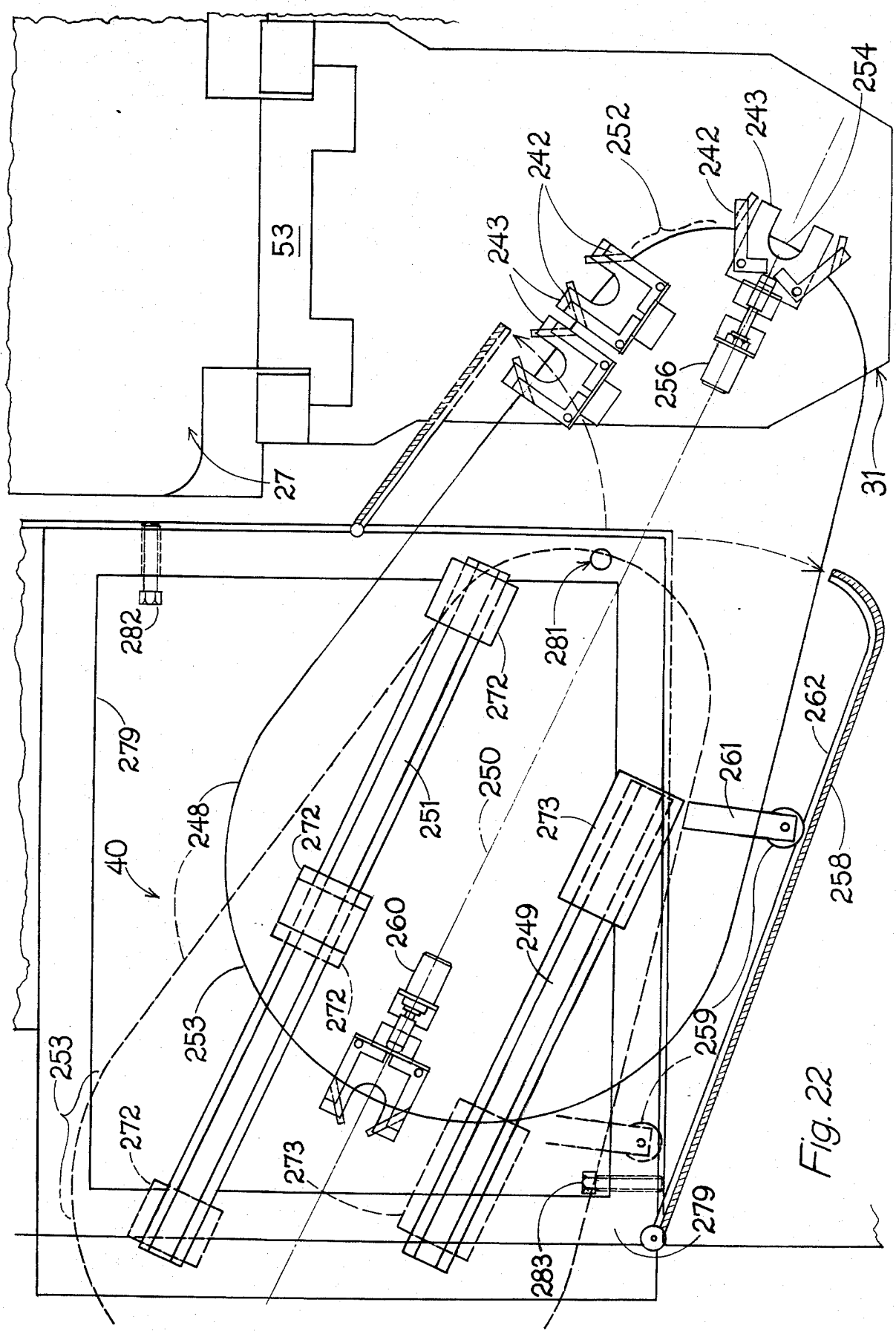
FIG. 22 is a top plan diagrammatic view of the two positions of the tool changer assembly, its advanced tool changing position being shown in solid lines, and its retracted storage position being shown in dashed lines.

In the schematic view of FIG. 22, the egg-shaped outline of the tool changer carriage 248 represents the path of travel of the individual tools in toolholders as they are indexed along the periphery of the carriage. As shown in FIG. 22, this path of travel is bounded by a circular arcuate segment 252 corresponding to the travel of blocks 243 around the rim of the small forward sprocket wheels 246, and a larger rear arcuate segment 253 corresponding to the travel of blocks 243 around the rim of the large rear sprocket wheels 247, with these segments being joined by tangent straight segments along the sides of the carriage It will be noted that the centers of the two arcuate segments joined by the center line 250 of the carriage are arrayed at an angle preferably of twenty-five degrees from the X-axis or sixty-five degrees from the Y-axis, and that the forwardmost portion of the small forward arcuate segment 252, defining the forwardmost point on the path of travel of each successively indexed tool, is preferably aligned with the center line of the spindle at the point 254 over the center of the path of travel of table 24, which forms the tool changing station for the machine.

The tool changer carriage 248 with the first tool indexed into its forwardmost position is moved forward to point 254, and the spindle is automatically moved downward to receive the tool through the actuation of the spindle collet. The spring actuated jaws 242 on block 243 are opened by actuation of a compressed air cylinder 256 mounted on the forward central upper portion of the carriage, releasing the toolholder which is firmly clamped in the collet of the spindle 207. With the jaws 242 remaining empty, the tool changer carriage 248 is then retracted from the solid line position shown in FIG. 22 to the dashed line retracted position, moving along the rails 249 and 251. In FIG. 21, the jaws 242 for the tool block bearing the number "15" are shown after releasing the toolholder and returning to this retracted position, the dashed line position of FIG. 22.

Tool block 15 will normally remain indexed, ready to be returned to the forwardmost position ready to receive its tool in the next tool changing operation, and after releasing the tool to the jaws 242, the spindle is raised sufficiently to clear the remaining tools, the tool blocks are indexed by actuation of the chains 244 by a drive motor 255 mounted within the carriage 248 operating a timing belt 257, and the next preselected tool block is thus indexed into the forwardmost position beneath the spindle. The spindle may then descend to receive the tool which is released by the actuation of air cylinder 256, opening the jaws 242 on the new tool block. The cycle of tool changing operation is thus completed with the retraction of carriage 248 again to the dashed line position shown in FIG. 22.

A similar air cylinder 260 mounted on the other end of carriage 248 is connected for manual actuation to open the jaws of the tool block centered at the large rear sprocket wheels 247. This permits access via left outside access openings in the housing of tool changer mechanism 40, facilitating manual external removal and re-insertion of selected tools in toolholders in the retracted, dashed line position of the tool changer carriage, as part of the set-up procedure for the machines of the invention.

As indicated in FIG. 1, the tool changer 40 is normally concealed by a swinging front cover panel 258 having a vertical hinge axis at its left end, to protect the tool changer from chips and coolant during machining operations while the tool changer is retracted inside its housing in the dashed line position shown in FIG. 22. Cover 258 is pivoted out of the path of the tool changer during its forward movement by a roller cam 259 rotatably mounted at the end of a cam arm 261 protruding laterally from the forward side of the carriage 248 as shown in FIG. 21. The roller cam 259 engages a cam flange 262 along the lower edge of the swinging cover panel 258, which is resiliently biased to close as cam 259 retracts during the rearward movement of the carriage 248 following each tool changing operation.

Figure 23:
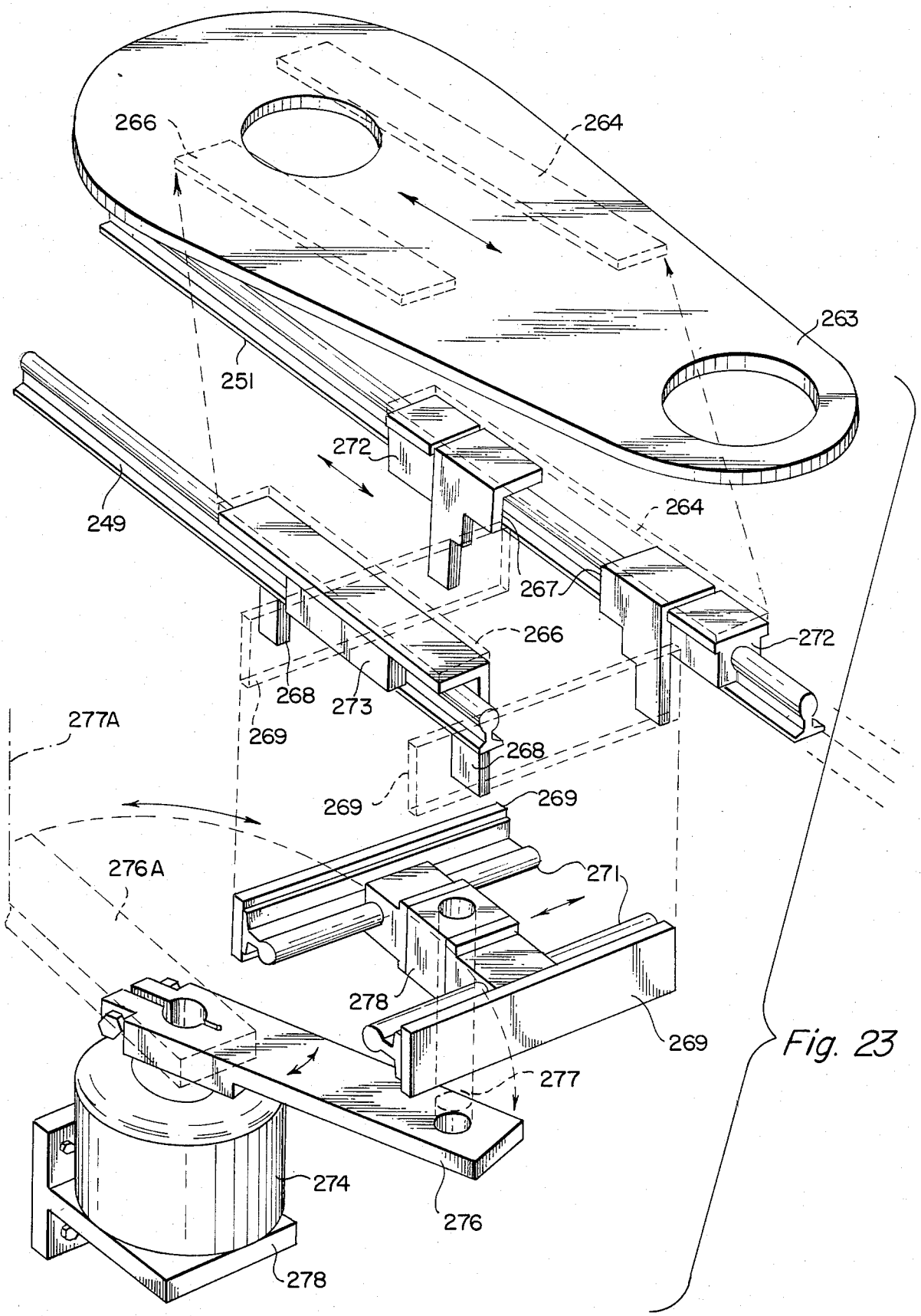
FIG. 23 is a schematic exploded perspective view of the tool changer advance and retraction mechanism.

The principal moving parts of the tool changer 40 providing tool indexing are illustrated in FIG. 21, while the mechanism causing advance and retraction of the tool changer carriage is illustrated schematically by the exploded perspective view of FIG. 23.

In FIG. 23, the shorter forward rail 249 and the longer rear rail 251 are illustrated under the bottom plate 263 supporting the sprocket wheels, the indexing motor and the upper plate on which the air cylinders 256 and 260 are mounted to form the carriage 248 shown in FIG. 21. On the underside of bottom plate 263 are shown in dashed lines the mounting position for a left mounting bar 264 and a right mounting bar 266 which are shown in dashed lines just above the rails 249 and 251 in FIG. 23.

Secured as by welding to the underside to each of the two bars are a pair of downwardly depending angle brackets. Left brackets 267 are secured extending downward from the underside of left bar 264 and similar right brackets 268 extending downward from the underside of right mounting bar 266. The facing notched inner edges of the brackets 267 and 268 provide mounting surfaces on which the outside faces of a pair of transverse rail supporting bars 269 are mounted as by welding, as shown in the dashed line positions in the middle of FIG. 23. The same bars 269 are shown in solid lines in the lower portion of FIG. 23, carrying on their inner facing surfaces a facing pair of transverse rails 271.

The mounting bars 264 and 266 secured to the underside of bottom plate 263 as by welding also carry on their undersides sliding blocks, left blocks 272 and a longer right block 273, which are grooved lengthwise in the direction of advancing or retracting motion of the tool changer for sliding engagement on the rails 249 and 251, as illustrated in FIG. 23. The grooves of blocks 272 and 273 are key-hole or T-shaped, to embrace the head of the rails 249 and 251, and to extend thereunder toward the web of each rail, thus capturing the blocks and positioning them in stable orientation with freedom only for lengthwise movement along the axis of the two parallel rails.

The force producing this advancing and retracting motion of the tool changer along the axis of rails 249 and 251 is provided by a reversible drive motor 274 designed to cause its shaft to pivot only through about one hundred eighty degrees of rotation. Mounted on the shaft of motor 274 is a crank arm 276 whose distal end is secured by a pivoting crank pin 277 shown in dashed lines in FIG. 23 to a sliding follower block 278 spanning the space between the two facing transverse rails 271. The outer ends of block 278 are grooved in the same manner that the blocks 272 and 273 are grooved with key-hole or T-shaped slots slidingly engaging the heads and embracing the webs of the two transverse rails 271. Arcuate motion of arm 276 caused by the one hundred eighty degree pivoting actuation of the shaft of motor 274 thus causes transverse reciprocating motion of block 278 along the transverse rails 271. Since these rails are secured between bars 269 on the depending brackets 267 and 268, the transverse motion of block 278 is thus transmitted to the bars 269, causing the bottom plate 263 and the entire carriage 248 to move lengthwise along its supporting rails 249 and 251. This advancing and retracting tool changer mechanism thus translates the angular motion of the pin 277 firstly into transverse harmonic reciprocating motion of block 278 between the rails 271 and, secondly into transverse motion of carriage 248 along the rails 249 and 251.

As viewed in FIG. 23, the motion of pin 277 from its dot-dash position 277A at the left-hand side of FIG. 23 in a clockwise arc thus results in the movement of block 278 toward the right across the transverse rails 271 during the first half of pin 277's arc, and then back to the left during the second half. This also moves pin 277, block 278, bars 269, brackets 267 and 268 and thereby plate 263 and the entire carriage 248 toward the right, advancing it along the rails 249 and 251 from the retracted dashed line position at the left side of FIG. 22 toward the solid line tool changing extended position of the tool changer in FIG. 22, with the axis of the forwardmost tool coinciding with the spindle axis at point 254 directly under the head 31 as the carriage completes its forward motion and crank arm 276 reaches the forward limit of its counterclockwise motion.

Retraction of the carriage 248 is produced by counterclockwise angular pivoting motion of bar 276 as motor 274 is actuated in the opposite direction, reversing the foregoing movement of the tool changer. As shown in FIG. 22, the stationary parts of the framework supporting the tool changer mechanism, namely rails 249 and 251 and motor 274 on its mounting bracket 278 are mounted on a generally rectangular frame 279. The frame 279 is positioned on the base of the overall system by a pivot pin 281 near the right-hand forward corner of the frame in the position shown in FIG. 22, allowing slight horizontal pivoting motion of the tool changer to swing the advance-retraction axis of the carriage slightly in a horizontal plane about the pivot pin 281 thus allowing a fine adjustment and alignment of the point 254 representing the axis of the forwardmost tool carried by the tool changer in its forwardmost position for the desired coincidence with the spindle axis directly under head assembly 31 when the tool changer 40 is in its advanced position.

The adjustment of tool changer frame 279 is produced by the operation of adjusting screws 282 and 283 threaded into frame 279 and bearing against the machine base as shown in FIG. 22. Since these adjusting screws operate against each other, advancing in opposite peripheral directions at substantially similar radial distances from the axis of the tool changer pivot pin 281, each of these screws must be retracted before the other can be advanced to secure the desired fine adjustment of this point 254.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A machine tool for performing a plurality of precisely controlled machining operations on a workpiece, said machine tool comprising:
(A) a support member adapted for securely mounted holding interconnection of three independent way members to three surface areas thereof, the support member being further defined as comprising:
   (1) a support base for secure retained holding interconnection of two of the three way members,
   (2) a cooperating head support portion adapted for receipt and mounted interconnection with the third way member, and
   (3) a way member holding pivot pin secured therein along each of the way member receiving surface portions thereof, with a section of each pin extending above the way member receiving surface portion;
(B) three independent, elongated way members, each defining one of the three cooperating axes employed in precisely controlling each machining operation, each of the way members
   (1) comprising a single, unitary structure securable to one of the way member receiving surface portions of the support member,
   (2) having a pair of spaced, cooperating flanges, each defined by two parallel guiding surfaces, (3) said guiding surfaces of each flange being machined flat to define a first pair of parallel planes, each of said first pair of planes being formed by the opposed, spaced, guiding surfaces of opposite flanges, (4) with means forming a third pair of flat guiding surfaces being positioned in cooperating spaced relationship defining a second pair of planes, and (5) each elongated way member incorporating preliminary alignment means and final anchoring means cooperatively connecting the way member to the support member in precise alignment, the preliminary alignment means being a pin-receiving hole formed therein along the central axis thereof and having an axis substantially perpendicular to the first pair of parallel planes, with said pin-receiving hole being positioned for telescopic receipt of the pivot pin extending from the support member for engagement therewith, mounting each of the way members for angular pivoting movement through a limited arc about the axis defined by said pivot pin;

(C) a powered machine tool driver mounted for movement along two of said three independent way members; and (D) a workpiece supporting table slidably mounted to the third way member for movement therealong; thereby providing an economical system for securely mounting the way members to the support member in precise alignment while also assuring that each way member is angularly adjustable to be preliminarily positioned precisely perpendicular to the other two way members, and may then be anchored in this aligned position, whereby a machine tool is achieved wherein the way members thereof are machinable with precision prior to installation, and machining adjustments thereto during installation are eliminated.

2. The machine tool defined in claim 1, wherein the second pair of planes of each of the way members is further defined as being paralled to each other and perpendicular to the first pair of parallel planes, whereby the flat guiding surfaces accommodate wedge-adjustable bearing blocks positioning the tool driver and the table for movement along their respective way members.

3. The machine tool defined in claim 1, wherein each of said way members further comprises a second locater hole formed therein, positioned along the central axis thereof near the end opposite the position of the first, pin-receiving hole, with said second, locater hole forming a guide for the drilling and reaming of a corresponding locater hole in said support member with an axis substantially identical to the axis of the second, locater hole, and a locater pin secured in said newly formed hole of the support member, and extending into the second locater hole of the way member, thereby providing a second pin extending from said support member in cooperating relationship to said first pin, establishing the aligned position of each of said way members for reinstallation, whenever required.

4. The machine tool defined in claim 3, wherein the support member and each of the way members further incorporate a plurality of screw-receiving holes formed therein, with the holes of the way members being positioned in cooperating aligned relationship with the screw-receiving holes formed in said support member, each of the holes in the way members having a diameter slightly greater than the diameter of the corresponding holes in the support member, thereby providing quick and easy means for securely affixing each of said way members anchored to the support member while also providing sufficient angular, pivoting movement for the requisite way member adjustment.

5. The machine tool defined in claim 4, further comprising a plurality of polymer plugs positioned in the screw receiving holes of the way members flush with the surface thereof, thereby preventing grease and dirt from coming in contact with the screw means.

6. A way system for mounted attachment to a machine tool for accurately performing a plurality of precisely controlled machining operations on a workpiece, said way system comprising three independent, elongated way members, each defining one of three cooperating axes employed in precisely controlling each machining operation, each of the way members (A) comprising a single, unitary structure securable to way member receiving surface portions of a support member, (B) having a pair of spaced, cooperating flanges, each defined by two parallel guiding surfaces, (C) said guiding surfaces of each flange being machined flat to define a first pair of parallel planes, each of said first pair of planes being formed by the opposed, spaced, guiding surfaces of opposite flanges, (D) with means forming a third pair of flat guiding surfaces being positioned in cooperating spaced relationship defining a second pair of planes, (E) each elongated way member incorporating preliminary alignment means and final anchoring means cooperatively connecting it to the support member in precise alignment, and said preliminary alignment means being a pin-receiving hole formed in the way member along a central axis thereof and having an axis substantially perpendicular to the first pair of parallel planes, with said pin-receiving hole being positioned for telescopic receipt of a pivot pin extending from said support member for engagement therewith, mounting each of the way members for angular pivoting movement through a limited arc about the axis defined by said pivot pin.

7. The way system defined in claim 6, wherein each of the second pair of planes is defined as being parallel to each other and perpendicular to the first pair of parallel planes.

* * * * *